(12) United States Patent
Kashiwagi

(10) Patent No.: US 8,288,475 B2
(45) Date of Patent: Oct. 16, 2012

(54) PROCESS FOR PRODUCING ELECTRET, AND ELECTROSTATIC INDUCTION CONVERSION DEVICE

(75) Inventor: Kimiaki Kashiwagi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/177,493

(22) Filed: Jul. 6, 2011

(65) Prior Publication Data

US 2011/0263788 A1 Oct. 27, 2011

Related U.S. Application Data

(63) Continuation of application No. PCT/JP2010/051990, filed on Feb. 10, 2010.

(30) Foreign Application Priority Data

Feb. 20, 2009 (JP) .................. 2009-038508

(51) Int. Cl.
*C08L 27/22* (2006.01)
(52) U.S. Cl. ....................................... 525/104
(58) Field of Classification Search .................... 525/104
See application file for complete search history.

(56) References Cited

U.S. PATENT DOCUMENTS

2010/0127595 A1 * 5/2010 Suzuki et al. ................. 310/300

FOREIGN PATENT DOCUMENTS

| JP | 04-189880 | * | 7/1992 |
| JP | 2006-180450 | | 7/2006 |
| JP | 2008-266563 | | 11/2008 |
| WO | WO-2008/114489 A1 | | 9/2008 |
| WO | WO-2008/133088 A1 | | 11/2008 |

OTHER PUBLICATIONS

JP 04-189880 Abstract in English.*
JP 04 189880 Abstract in English (1992).*
International Search Report in PCT/JP2010/051990 dated Mar. 23, 2010.

* cited by examiner

*Primary Examiner* — Kuo-Liang Peng
(74) *Attorney, Agent, or Firm* — Foley and Lardner LLP

(57) ABSTRACT

A process is disclosed for producing an electret, which includes a step of thermally treating a composition including a fluorinated polymer and a silane coupling agent, where the fluorinated polymer has an alicyclic structure in its main chain and has a carboxy group or an alkoxycarbonyl group as its terminal group. The silane coupling agent has an amino group; and the temperature for the thermal treatment is from 250° C. to 330° C.

10 Claims, 2 Drawing Sheets

PROCESS FOR PRODUCING ELECTRET, AND ELECTROSTATIC INDUCTION CONVERSION DEVICE

TECHNICAL FIELD

The present invention relates to a process for producing an electret, and an electrostatic induction conversion device.

BACKGROUND ART

Heretofore, an electrostatic induction conversion device such as a power-generating unit or a microphone has been proposed wherein an electret having an electric charge injected to an insulating material, is used.

As the insulating material for such an electret, it has been common to use a linear fluororesin such as polytetrafluoroethylene.

Recently, it has been proposed to use a polymer having a fluorinated alicyclic structure in its main chain (e.g. Patent Document 1), as the insulating material for such an electret. Further, it has also been proposed to improve the surface voltage by using one having a silane coupling agent further mixed to a polymer having a fluorinated alicyclic structure in its main chain and having a carboxy group as its terminal group, as the insulating material for an electret (Patent Document 2). Patent Document 2 discloses an Example wherein a polymer having an intrinsic viscosity of 0.23 (corresponding to a weight average molecular weight of 165,000) and a silane coupling agent are mixed and thermally treated at 200° C.

PRIOR ART DOCUMENTS

Patent Documents

Patent Document 1: JP-A-2006-180450
Patent Document 2: WO2008/114489

DISCLOSURE OF INVENTION

Technical Problem

However, conventional electrets have a problem such that it is difficult to maintain an injected electric charge stably at a high temperature, and such an electric charge is likely to be discharged with time at a high temperature. Such a problem tends to cause reduction of the surface voltage of the electret, thus leading to the deterioration of e.g. electrostatic induction performance of an electrostatic induction conversion device using the electret. Therefore, it has been desired to improve the charge retention performance, especially the thermal stability, so that the injected electric charge can be stably retained.

An electret is required to have thermal stability in various applications. For example, in its application to an electret condenser microphone (hereinafter referred to as ECM), injected electric charges are required to be maintained to some extent after a solder reflow step. The maximum temperature of the solder reflow step is about 260° C., and in order to maintain a sufficient performance as ECM, it is important that the surface voltage after the step remains to be at least 200 V. The higher the remaining voltage, the higher the performance of ECM.

Whereas, in a case where an electrostatic induction conversion device is used as mounted on a vehicle, particularly around an engine, a long term stability at 125° C. becomes important. In such an application, it is specifically required that attenuation of the surface voltage of an electret film is little when the electret is exposed in an environment of 125° C. for a long time. By conventional electrets, it has been difficult to satisfy such a requirement.

The present invention has been made in view of the above problem and has an object to provide a process for producing an electret which has high thermal stability of retained electric charge and which has excellent charge retention performance, and an electrostatic induction conversion device comprising such an electret.

Solution to Problem

In order to accomplish the above object, the present invention provides the following.

[1] A process for producing an electret, which comprises a step of thermally treating a composition comprising a fluorinated polymer and a silane coupling agent, wherein the fluorinated polymer has an alicyclic structure in its main chain and has a carboxy group or an alkoxycarbonyl group as its terminal group; the silane coupling agent has an amino group; and the temperature for the thermal treatment is from 250° C. to 330° C.

[2] The process for producing an electret according to [1], wherein the fluorinated polymer has, as the alicyclic structure, a fluorinated alicyclic structure in its main chain.

[3] The process for producing an electret according to [1] or [2], wherein the fluorinated polymer has, as the alicyclic structure, a cyclic structure containing an etheric oxygen atom, in its main chain.

[4] The process for producing an electret according to any one of [1] to [3], wherein the fluorinated polymer has, as the alicyclic structure, a fluorinated alicyclic structure containing an etheric oxygen atom, in its main chain.

[5] The process for producing an electret according to any one of [1] to [4], wherein the weight average molecular weight of the fluorinated polymer is from 150,000 to 650,000.

[6] The process for producing an electret according to any one of [1] to [5], wherein the silane coupling agent is at least one member selected from the group consisting of γ-aminopropylmethyldiethoxysilane, γ-aminopropylmethyldimethoxysilane, N-(β-aminoethyl)-γ-aminopropylmethyldimethoxysilane, N-(β-aminoethyl)-γ-aminopropylmethyldiethoxysilane, γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane and aminophenyltrimethoxysilane.

[7] The process for producing an electret according to any one of [1] to [6], wherein the content of the silane coupling agent is from 0.1 to 20 mass %, based on the total amount of the fluorinated polymer and the silane coupling agent.

[8] The process for producing an electret according to any one of [1] to [7], which includes the following (1) to (4) in the order of (1), (2), (3) and (4):

(1) a step of obtaining a coating fluid having the fluorinated polymer and the silane coupling agent dissolved in a solvent (a coating fluid-preparation step), (2) a step of coating a substrate with the coating fluid to form a coating layer comprising the fluorinated polymer and the silane coupling agent (a coating step), (3) a step of thermally treating the coating layer to obtain a coating film (a thermal treatment step), and (4) a step of injecting an electric charge to the coating film after the thermal treatment.

[9] The process for producing an electret according to [8], wherein the solvent is a fluorinated organic solvent.

[10] An electrostatic induction conversion device comprising the electret obtained by the process as defined in any one of [1] to [9].

ADVANTAGEOUS EFFECTS OF INVENTION

According to the present invention, it is possible to provide an electret which has high stability with time and thermal stability of retained electric charge and which has excellent charge retention performance, and an electrostatic induction conversion device comprising such an electret.

DESCRIPTION OF EMBODIMENTS

Figure 1:
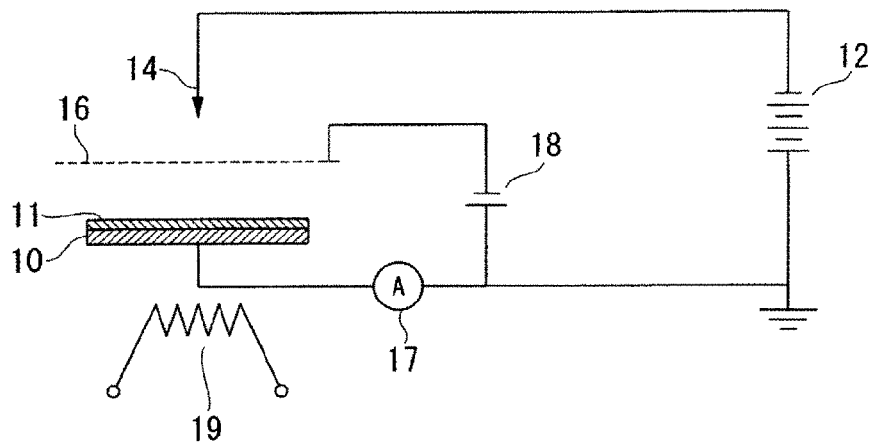
FIG. 1 is a schematic diagram illustrating a corona charging equipment used for injection of electric charge.

Now, the present invention will be described in further detail.

In this specification, repeating units constituting a polymer may be referred to simply as "units".

Further, a compound represented by the formula (1) may be referred to also as "a compound (1)". A unit, compound or the like represented by another formula will be referred to in a similar manner, and for example, a unit represented by the formula (3-1) may be referred to also as "a unit (3-1)".

The present invention is characterized by comprising a step of thermally treating a composition for an electret comprising a specific fluorinated polymer and a silane coupling agent at a specific temperature.

The present invention preferably includes the following steps in the following order.

(1) A step of obtaining a coating fluid having the specific fluorinated polymer and the silane coupling agent dissolved in a solvent (a coating fluid-preparation step), (2) a step of coating a substrate with the coating fluid to form a coating layer comprising the specific fluorinated polymer and the silane coupling agent (a coating step), (3) a step of thermally treating the coating layer at a specific temperature to obtain a coating film (a thermal treatment step), and (4) a step of injecting an electric charge to the coating film after the thermal treatment (an electric charge-injection step).

<Fluorinated Polymer>

The specific fluorinated polymer (hereinafter referred to as the polymer (A)) to be used in the present invention is a fluorinated polymer having an alicyclic structure in its main chain and having a carboxy group or an alkoxycarbonyl group as its terminal group.

The "alicyclic structure" means a cyclic structure having no aromaticity. Further, "having an alicyclic structure in its main chain" means that among carbon atoms constituting the cyclic structure, at least one is a carbon atom constituting the main chain of the polymer (A).

The alicyclic structure may be one wherein the cyclic skeleton is constituted solely by carbon atoms, or may be a heterocyclic structure which contains, in addition to carbon atoms, a heteroatom such as an oxygen atom, a nitrogen atom or the like.

For example, a saturated or unsaturated hydrocarbon ring structure which may have a substituent, or a heterocyclic structure having some of carbon atoms in such a hydrocarbon ring structure substituted by a heteroatom such as oxygen atom, a nitrogen atom or the like, may be mentioned.

Among them, an alicyclic structure of a heterocyclic structure having 1 or 2 etheric oxygen atoms in its cyclic skeleton, is preferred.

The number of atoms constituting the cyclic skeleton of the alicyclic structure is preferably from 4 to 7, more preferably 5 or 6. That is, the alicyclic structure is preferably a 4- to 7-membered ring, more preferably a 5- or 6-membered ring.

Among carbon atoms constituting the alicyclic structure, the carbon atoms constituting the main chain are derived from a polymerizable double bond of a monomer used for the polymerization for the polymer (A).

For example, in a case where the fluorinated polymer is a fluorinated polymer obtained by polymerization of a cyclic monomer as described hereinafter, two carbon atoms constituting such a double bond become the carbon atoms constituting the main chain.

Further, in the case of a fluorinated polymer obtained by cyclopolymerization of a monomer having two polymerizable double bonds, at least two among four carbon atoms constituting the two polymerizable double bonds become the carbon atoms constituting the main chain.

The polymer (A) is preferably a fluorinated polymer having a fluorinated alicyclic structure in its main chain. That is, the alicyclic structure in the main chain is preferably a fluorinated alicyclic structure.

The "fluorinated alicyclic structure" is an "alicyclic structure" having fluorine atom(s). Further, "having a fluorinated alicyclic structure in its main chain" means that at least one of carbon atoms constituting the fluorinated alicyclic structure is a carbon atom constituting the main chain of the polymer (A).

Further, in a case where all of the alicyclic structures in the main chain of the polymer (A) are alicyclic structures other than fluorinated alicyclic structures, fluorine atoms may be bonded to the main chain not forming a cyclic structure.

The fluorinated alicyclic structure may, for example, be a saturated or unsaturated hydrocarbon ring structure which may have a substituent, or one wherein some or all of hydrogen atoms in e.g. a heterocyclic structure having some of carbon atoms in such a hydrocarbon ring structure substituted by a heteroatom such as an oxygen atom, a nitrogen atom or the like, are substituted by fluorine atoms. Among them, a fluorinated alicyclic structure of a heterocyclic structure having one or two etheric oxygen atoms in its cyclic skeleton, is preferred. Further it is preferred that all of hydrogen atoms are substituted by fluorine atoms.

The polymer (A) is preferably the following fluorinated cyclic polymer (I') or fluorinated cyclic polymer (II').

Fluorinated cyclic polymer (I'): a polymer having a unit based on a cyclic fluorinated monomer.

Fluorinated cyclic polymer (II'): a polymer having a unit formed by cyclopolymerization of a diene-type fluorinated monomer.

Further, the "cyclic polymer" means a polymer having a cyclic structure.

The fluorinated cyclic polymer (I') has a unit based on the "cyclic fluorinated monomer".

The "cyclic fluorinated monomer" is a monomer having a polymerizable double bond between carbon atoms constituting a fluorinated alicyclic ring, or a monomer having a polymerizable double bond between a carbon atom constituting a fluorinated alicyclic ring and a carbon atom of other than a fluorinated alicyclic ring.

Such a cyclic fluorinated monomer is preferably the following compound (1) or compound (2).

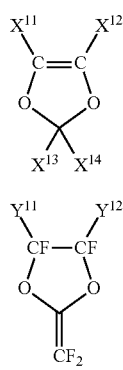

(1)

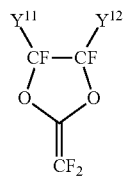

(2)

In the above formulae, each of $X^{11}, X^{12}, X^{13}, X^{14}, Y^{11}$ and $Y^{12}$ which are independent of one another, is a fluorine atom, a perfluoroalkyl group or a perfluoroalkoxy group.

The perfluoroalkyl group for $X^{11}, X^{12}, X^{13}, X^{14}, Y^{11}$ and $Y^{12}$ has preferably from 1 to 7, more preferably from 1 to 4, carbon atoms. Such a perfluoroalkyl group is preferably linear or branched, more preferably linear. Specifically, it may, for example, be a trifluoromethyl group, a pentafluoroethyl group or a heptafluoropropyl group, and particularly preferred is a trifluoromethyl group.

The perfluoroalkoxy group for $X^{11}, X^{12}, X^{13}, X^{14}, Y^{11}$ and $Y^{12}$ may, for example, be one having an oxygen atom (—O—) bonded to the above perfluoroalkyl group. It may specifically be a trifluoromethoxy group.

$X^{11}$ is preferably a fluorine atom.

$X^{12}$ is preferably a fluorine atom, a trifluoromethyl group or a $C_{1-4}$ perfluoroalkoxy group, more preferably a fluorine atom or a trifluoromethoxy group.

Each of $X^{13}$ and $X^{14}$ which are independent of each other, is preferably a fluorine atom or a $C_{1-4}$ perfluoroalkyl group, more preferably a fluorine atom or a trifluoromethyl group.

Each of $Y^{11}$ and $Y^{12}$ which are independent of each other, is preferably a fluorine atom, a $C_{1-4}$ perfluoroalkyl group or a $C_{1-4}$ perfluoroalkoxy group, more preferably a fluorine atom or a trifluoromethyl group.

In the compound (1), $X^{13}$ and $X^{14}$ may be bonded to each other to form a second fluorinated alicyclic ring together with the carbon atoms to which $X^{13}$ and $X^{14}$ are bonded.

Such a second fluorinated alicyclic ring is preferably a 4- to 6-membered ring.

Such a second fluorinated alicyclic ring is preferably a saturated alicyclic ring.

Such a second fluorinated alicyclic ring may have an etheric oxygen atom (—O—) in the cyclic skeleton. In such a case, the number of etheric oxygen atoms in the fluorinated alicyclic ring is preferably 1 or 2.

In the compound (2), $Y^{11}$ and $Y^{12}$ may be bonded to each other to form a second fluorinated alicyclic ring together with the carbon atoms to which $Y^{11}$ and $Y^{12}$ are bonded.

Such a second fluorinated alicyclic ring is preferably a 4- to 6-membered ring.

Such a second fluorinated alicyclic ring is preferably a saturated alicyclic ring.

Such a second fluorinated alicyclic ring may have an etheric oxygen atom (—O—) in the cyclic skeleton. In such a case, the number of etheric oxygen atoms in the fluorinated alicyclic ring is preferably 1 or 2.

Preferred specific examples of the compound (1) include compounds (1-1) to (1-5).

Preferred specific examples of the compound (2) include compounds (2-1) and (2-2).

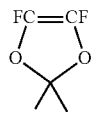

(1-1)

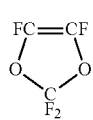

(1-2)

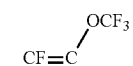

(1-3)

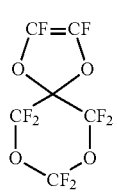

(1-4)

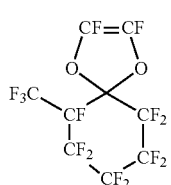

(1-5)

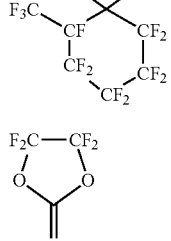

(2-1)

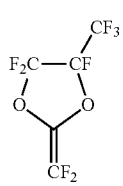

(2-2)

The fluorinated cyclic polymer (I') may be constituted solely by a unit formed by the above cyclic fluorinated monomer, or may be a copolymer having such a unit and another unit.

However, in such a fluorinated cyclic polymer (I'), the proportion of the unit based on the cyclic fluorinated monomer is preferably at least 20 mol %, more preferably at least 40 mol %, or may be 100 mol %, based on the total of all repeating units constituting the fluorinated cyclic polymer (I').

Said another monomer may be one copolymerizable with the above cyclic fluorinated monomer and is not particularly limited. Specifically, the after-mentioned diene-type fluorinated monomer, a monomer having a reactive functional group in the side chain, tetrafluoroethylene, chlorotrifluoroethylene or perfluoro(methyl vinyl ether) may, for example, be mentioned.

Further, a polymer obtainable by copolymerization of the cyclic fluorinated monomer with the diene-type fluorinated monomer is regarded as the fluorinated cyclic polymer (I').

The monomer having the above reactive functional group in the side chain, copolymerizable with the above cyclic fluorinated monomer, may be a fluorinated monomer such as methyl 2,2,3,3,4,4-hexafluoro-4-(1,2,2-trifluorovinyloxy)butanoate, methyl 2,2,3,3-tetrafluoro-3-(1,1,2,2,3,3-hexafluoro-3-(1,2,2-trifluorovinyloxy)propoxy)propanoate, 1,1,2,2-tetrafluoro-2-(1,1,1,2,3,3-hexafluoro-3-(1,2,2-trifluorovinyloxy)propan-2-yloxy)ethanesulfonyl fluoride or 1,1,2,2-tetrafluoro-2-(1,2,2-trifluorovinyloxy)ethanesulfonyl fluoride, or a hydrocarbon monomer such as hydroxyethyl vinyl ether, hydroxypropyl vinyl ether, hydroxybutyl vinyl ether, 2-(2-(vinyloxy)ethoxy)ethanol, methyl acrylate or hydroxyethyl acrylate.

As the fluorinated cyclic polymer (I'), it is preferred to use a homopolymer of a cyclic fluorinated monomer selected from compounds (1-1), (1-3) and (2-2), or a copolymer of one cyclic fluorinated monomer selected from the three compounds with one member selected from tetrafluoroethylene, chlorotrifluoroethylene and the after-mentioned diene-type fluorinated monomer.

It is most preferred to employ a copolymer of compound (1-1) with tetrafluoroethylene, or a copolymer of compound (1-1) with the diene-type fluorinated monomer.

As the diene-type fluorinated monomer to be used here, it is preferred to employ perfluorobutenyl vinyl ether ($CF_2$=$CFOCF_2CF_2CF$=$CF_2$), or perfluoro(4-methylbutenyl) vinyl ether ($CF_2$=$CFOCF(CF_3)CF_2CF$=$CF_2$), and it is most preferred to employ perfluorobutenyl vinyl ether.

The fluorinated cyclic polymer (II') has a unit formed by cyclopolymerization of "a diene type fluorinated monomer".

The "diene-type fluorinated monomer" is a monomer having two polymerizable double bonds and fluorine atoms. Such polymerizable double bonds are not particularly limited, but are preferably vinyl groups, allyl groups, acryloyl groups or methacryloyl groups.

The diene-type fluorinated monomer is preferably the following compound (3).

In the formula, Q is a $C_{1-5}$, preferably $C_{1-3}$, perfluoroalkylene group which may have a branch and which may have an etheric oxygen atom and wherein some of fluorine atoms may be substituted by halogen atoms other than fluorine atoms. Such halogen atoms other than fluorine atoms may, for example, be chlorine atoms or bromine atoms.

Q is preferably a perfluoroalkylene group having an etheric oxygen atom, and in such a case, the etheric oxygen atom in the perfluoroalkylene group may be present at one terminal of the group or may be present at both terminals of the group, or may be present between carbon atoms of the group. From the viewpoint of the cyclopolymerizability, it is preferably present at one terminal of the group.

The following compounds may be mentioned as specific examples of the compound (3).

$CF_2$=$CFOCF_2CF$=$CF_2$,
$CF_2$=$CFOCF(CF_3)CF$=$CF_2$,
$CF_2$=$CFOCF_2CF_2CF$=$CF_2$,
$CF_2$=$CFOCF_2CF(CF_3)CF$=$CF_2$,
$CF_2$=$CFOCF(CF_3)CF_2CF$=$CF_2$,
$CF_2$=$CFOCFClCF_2CF$=$CF_2$,
$CF_2$=$CFOCCl_2CF_2CF$=$CF_2$,
$CF_2$=$CFOCF_2OCF$=$CF_2$,
$CF_2$=$CFOC(CF_3)_2OCF$=$CF_2$,
$CF_2$=$CFOCF_2CF(OCF_3)CF$=$CF_2$,
$CF_2$=$CFCF_2CF$=$CF_2$,
$CF_2$=$CFCF_2CF_2CF$=$CF_2$,
$CF_2$=$CFCF_2OCF_2CF$=$CF_2$.

As the unit to be formed by cyclopolymerization of the compound (3), the following units (3-1) to (3-4) may be mentioned.

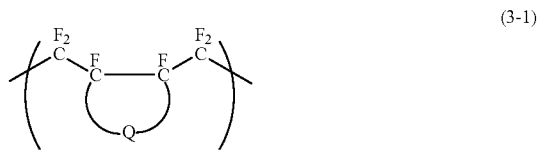

(3-1)

(3-2)

(3-3)

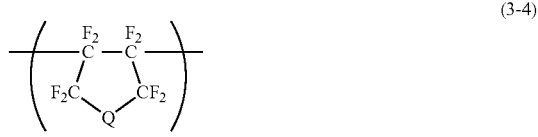

(3-4)

As the unit to be formed by cyclopolymerization of the compound (3), more specifically, the following units (3-a) to (3-k) may be mentioned. In the units (3-a) to (3-k), one of x and y is 0, and the other is 1.

Here, the units (3-a) to (3-k) correspond to the above unit (3-1) when x=0 and y=1, and they correspond to the above unit (3-2) when x=1 and y=0.

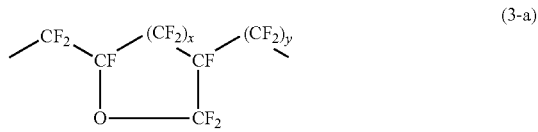

(3-a)

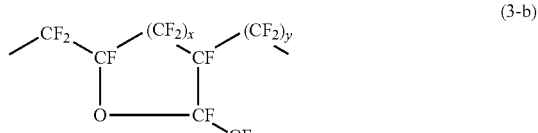

(3-b)

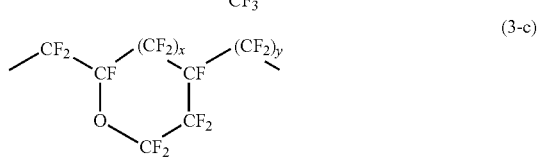

(3-c)

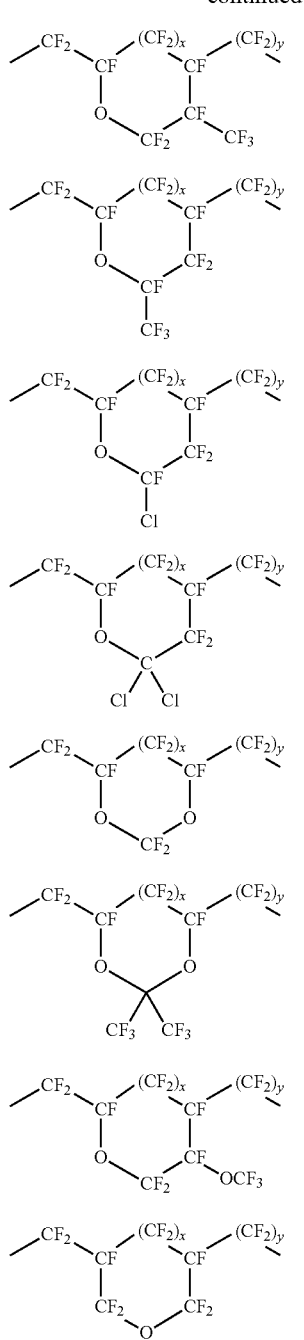

The fluorinated cyclic polymer (II') may be constituted solely by a unit formed by cyclopolymerization of the above diene-type fluorinated monomer, or may be a copolymer having such a unit and another unit.

However, in such a fluorinated cyclic polymer (II'), the proportion of the unit formed by cyclopolymerization of the diene-type fluorinated monomer is preferably at least 50 mol %, more preferably at least 80 mol %, most preferably 100 mol %, based on the total of all repeating units constituting the fluorinated cyclic polymer (II').

Said another monomer may be one copolymerizable with the above diene-type fluorinated monomer and is not particularly limited. Specifically, a cyclic fluorinated monomer such as the above-mentioned compound (1) or (2), a monomer having the above reactive functional group in the side chain, tetrafluoroethylene, chlorotrifluoroethylene, or perfluoro(methyl vinyl ether) may, for example, be mentioned.

The monomer having the above reactive functional group in the side chain, copolymerizable with the above diene type fluorinated monomer, may, for example, be a fluorinated monomer such as methyl 2,2,3,3,4,4-hexafluoro-4-(1,2,2-trifluorovinyloxy)butanoate, methyl 2,2,3,3-tetrafluoro-3-(1,1,2,2,3,3-hexafluoro-3-(1,2,2-trifluorovinyloxy)propoxy)propanoate, 1,1,2,2-tetrafluoro-2-(1,1,1,2,3,3-hexafluoro-3-(1,2,2-trifluorovinyloxy)propan-2-yloxy)ethanesulfonyl fluoride or 1,1,2,2-tetrafluoro-2-(1,2,2-trifluorovinyloxy) ethanesulfonyl fluoride, or a hydrocarbon monomer such as hydroxyethyl vinyl ether, hydroxypropyl vinyl ether, hydroxybutyl vinyl ether, 2-(2-(vinyloxy)ethoxy)ethanol, methyl acrylate or hydroxyethyl acrylate.

As the fluorinated cyclic polymer (II'), it is preferred to use a homopolymer obtainable from one diene-type fluorinated monomer selected from perfluorobutenyl vinyl ether ($CF_2$=$CFOCF_2CF_2CF$=$CF_2$), perfluoro(3-methylbutenyl) vinyl ether ($CF_2$=$CFOCF_2CF(CF_3)CF$=$CF_2$), perfluoro(4-methylbutenyl) vinyl ether ($CF_2$=$CFOCF(CF_3)CF_2CF$=$CF_2$), perfluoro(4-chlorobutenyl) vinyl ether ($CF_2$=$CFOCFClCF_2CF$=$CF_2$), perfluoro(4,4'-dichlorobutenyl) vinyl ether ($CF_2$=$CFOCCl_2CF_2$ $CF$=$CF_2$) and perfluoro(3-methoxybutenyl) vinyl ether ($CF_2$=$CFOCF_2CF$ $(OCF_3)CF$=$CF_2$), or a copolymer of two or three members selected from the above six diene-type fluorinated monomers or a copolymer of one diene-type fluorinated monomer selected from the above six members with tetrafluoroethylene or chlorotrifluoroethylene. It is more preferred to employ a homopolymer of one diene-type fluorinated monomer selected from the above six members, and it is most preferred to employ a homopolymer of perfluorobutenyl vinyl ether or perfluoro(3-methylbutenyl) vinyl ether.

Polymer (A) has a carboxy group or an alkoxycarbonyl group as its terminal group. The alkoxycarbonyl group may, for example, be a methoxycarbonyl group, an ethoxycarbonyl group, a propoxycarbonyl group, an isopropoxycarbonyl group, a butoxycarbonyl group or a tert-butoxycarbonyl group. The terminal group of the polymer (A) is preferably a carboxy group, a methoxycarbonyl group or an ethoxycarbonyl group.

The carboxy group or the alkoxycarbonyl group may be present at a main chain terminal or at a side chain terminal, or at both the main chain terminal and the side chain terminal. From the production efficiency, it is particularly preferably present at a main chain terminal.

The polymer (A) having a carboxy group or an alkoxycarbonyl group at a main chain terminal may be obtained by carrying out polymerization by means of a polymerization initiator and decomposing an unstable terminal group thereby formed, by e.g. thermal treatment, to form a carbonylfluoride group (—CF═O group) at the terminal, followed by post treatment.

As the above post treatment, the carbonylfluoride group may be hydrolyzed to convert it to a carboxy group. Otherwise, it may be reacted with an alcohol to convert it to an alkoxycarbonyl group.

As the polymerization initiator, one commonly employed may be used, and a polymerization initiator having a peroxide group is particularly preferred. As a polymerization initiator having a peroxide group, either a hydrocarbon type polymerization initiator or a fluorinated polymerization initiator may be used.

As the hydrocarbon type polymerization initiator, specifically, diisopropyl peroxydicarbonate, diisobutyl peroxydicarbonate, dipropanoic acid peroxide, dibutanoic acid peroxide, benzoic peroxide or di-tert-butyl peroxide may, for example, be used.

As the fluorinated polymerization initiator, di-perfluoropropanoic acid peroxide, diperfluorobutanoic acid peroxide, perfluorobenzoic peroxide or di-perfluoro tert-butyl peroxide may, for example, be used.

The polymer (A) is preferably amorphous, since it is thereby excellent in the solubility in a solvent and has good compatibility with the after-described silane coupling agent.

The weight average molecular weight of polymer (A) is preferably at least 50,000, more preferably at least 150,000, further preferably at least 200,000, particularly preferably at least 250,000. If the weight average molecular weight is less than 50,000, film formation tends to be difficult. When it is at least 200,000, the heat resistance of the film will be improved, and the thermal stability as an electret will be improved.

On the other hand, if the number average molecular weight is too large, the polymer tends to be hardly soluble in a solvent, thus leading to a problem such that the film-forming process is restricted. Therefore, the weight average molecular weight of the polymer (A) is preferably at most 1,000,000, more preferably at most 850,000, further preferably at most 650,000, particularly preferably at most 550,000.

The intrinsic viscosity of the polymer (A) correlates with the molecular weight of the polymer (A). Accordingly, it preferably has an intrinsic viscosity corresponding to the above preferred molecular weight.

A specific preferred intrinsic viscosity value varies depending upon the units constituting the polymer (A). For example, in a case where the polymer (A) is a cyclic polymer of $CF_2=CFOCF_2CF_2CF=CF_2$, the intrinsic viscosity (30° C.) is preferably from 0.1 to 0.9 dl/g, more preferably from 0.2 to 0.8 dl/g, most preferably from 0.3 to 0.6 dl/g.

Such an intrinsic viscosity is a value measured by using e.g. perfluoro(2-butyltetrahydrofuran) as a solvent.

The polymer (A) preferably has a relative dielectric constant of from 1.8 to 8.0, more preferably from 1.8 to 5.0, particularly preferably from 1.8 to 3.0, in consideration of the charge retention performance. Such a relative dielectric constant is a value measured at a frequency of 1 MHz in accordance with ASTM D150.

Further, as the polymer (A), one having a high volume resistivity and a high dielectric breakdown voltage is preferred.

The volume resistivity of the polymer (A) is preferably from $10^{10}$ to $10^{20}$ Ω·cm, more preferably from $10^{16}$ to $10^{19}$ Ω·cm. Such a volume resistivity is measured in accordance with ASTM D257.

The dielectric breakdown voltage of the polymer (A) is preferably from 10 to 25 kV/mm, more preferably from 15 to 22 kV/mm. Such a dielectric breakdown voltage is measured in accordance with ASTM D149.

As the polymer (A), one having high hydrophobicity is preferred in order to exclude water which may be adversely influential over the insulating property and to maintain a high insulating property.

As the polymer (A), a commercial product may be used. As a commercial product of a fluorinated polymer which has an alicyclic structure containing an etheric oxygen atom in its main chain and which has a carboxy group or an alkoxycarbonyl group at a main chain terminal, CYTOP (registered trademark, manufactured by Asahi Glass Company, Limited) may be mentioned.

<Silane Coupling Agent>

The silane coupling agent to be used in the present invention is a silane coupling agent having an amino group. As such a silane coupling agent having an amino group, the following ones may be exemplified. (In the following, the silane coupling agent having an amino group may simply be referred to as the silane coupling agent.)

A dialkoxysilane such as γ-aminopropylmethyldiethoxysilane, γ-aminopropylmethyldimethoxysilane, N-(β-aminoethyl)-γ-aminopropylmethyldimethoxysilane or N-(β-aminoethyl)-γ-aminopropylmethyldiethoxysilane.

A trialkoxysilane such as γ-aminopropyltrimethoxysilane, γ-aminopropyltriethoxysilane, N-(β-aminoethyl)-γ-aminopropyltrimethoxysilane or N-(β-aminoethyl)-γ-aminopropyltriethoxysilane.

A silane coupling agent having an aromatic amine structure, such as a compound represented by the following formula (s1) or (s2):

$$ArSi(OR^{21})(OR^{22})(OR^{23}) \quad (s1)$$

$$ArSiR^{24}(OR^{21})(OR^{22}) \quad (s2)$$

[wherein each of $R^{21}$ to $R^{24}$ which are independent of one another is a hydrogen atom, a $C_{1-20}$ alkyl group or an aryl group, and Ar is a p-, m- or o-aminophenyl group.]

The following ones may be mentioned as specific examples of the compound represented by the formula (s1) or (s2):

aminophenyltrimethoxysilane, aminophenyltriethoxysilane, aminophenyltripropoxysilane, aminophenyltriisopropoxysilane, aminophenylmethyldimethoxysilane, aminophenylmethyldiethoxysilane, aminophenylmethyldipropoxysilane, aminophenylmethyldiisopropoxysilane, aminophenylphenyldimethoxysilane, aminophenylphenyldiethoxysilane, aminophenylphenyldipropoxysilane, aminophenylphenyldiisopropoxysilane, etc.

Any one of the above silane coupling agents may be used alone, or two or more of them may be used in combination.

Further, it is also preferred to use a partially hydrolyzed condensate of the above silane coupling agent. It is also preferred to use a co-partially hydrolyzed condensate of the above silane coupling agent with a tetraalkoxysilane such as tetramethoxysilane, tetraethoxysilane or tetrapropoxysilane.

In consideration of efficient availability, etc., a particularly preferred silane coupling agent is at least one member selected from γ-aminopropylmethyldiethoxysilane, γ-aminopropylmethyldimethoxysilane, N-(β-aminoethyl)-γ-aminopropylmethyldimethoxysilane, N-β-aminoethyl)-γ-aminopropylmethyldiethoxysilane, γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane and aminophenyltrimethoxysilane.

The content of the silane coupling agent is preferably from 0.1 to 20 mass %, more preferably from 0.3 to 10 mass %, most preferably from 0.5 to 5 mass %, based on the total amount of the polymer (A) and the silane coupling agent. Within such a range, it can be uniformly mixed with the polymer (A), and it is unlikely to undergo phase separation in the solution.

As the combination of the fluorinated polymer and the silane coupling agent, preferred is a combination of, as the fluorinated polymer, one member selected from a copolymer of the above compound (1-1) with tetrafluoroethylene or a diene-type fluorinated monomer, and a homopolymer of the after-mentioned diene-type fluorinated monomer, and, as the silane coupling agent, one member selected from γ-aminopropylmethyldiethoxysilane, γ-aminopropylmethyldimethoxysilane, N-(β-aminoethyl)-γ-aminopropylmethyldimethoxysilane, N-(β-aminoethyl)-γ-aminopropylmethyldiethoxysilane, γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane and aminophenyltrimethoxysilane. Particularly, most preferred is a combination of, as the fluorinated polymer, a homopolymer of the after-mentioned diene-type fluorinated monomer, and as the silane coupling agent, one member selected from γ-aminopropylmethyldiethoxysilane, N-(β-aminoethyl)-γ-aminopropylmethyldimethoxysilane, γ-aminopropyltriethoxysilane, aminophenyltrimethoxysilane, N-(β-aminoethyl)-γ-aminopropyltrimethoxysilane, N-(β- aminoethyl)-γ-aminopropyltriethoxysilane and aminophenyltrimethoxysilane.

As the diene-type fluorinated monomer to be used here, it is preferred to employ perfluorobutenyl vinyl ether ($CF_2=CFOCF_2CF_2CF=CF_2$) or perfluoro(4-methylbutenyl) vinyl ether ($CF_2=CFOCF(CF_3)CF_2CF=CF_2$), and it is most preferred to employ perfluorobutenyl vinyl ether.

<Coating Fluid-Preparation Step>

In the coating fluid-preparation step, a composition comprising the polymer (A) and the silane coupling agent is made into a coating fluid by means of a solvent.

In order to dissolve both of the polymer (A) and the silane coupling agent thereby to obtain a uniform coating fluid, as the solvent, it is preferred to use a solvent to dissolve the polymer (A) and a solvent to dissolve the silane coupling agent in combination.

If a solvent capable of dissolving both of the polymer (A) and the silane coupling agent is used, it is possible to obtain a uniform coating fluid by such a solvent alone.

As the solvent to dissolve the polymer (A), a fluorinated organic solvent may, for example, be used. As such a fluorinated organic solvent, an aprotic fluorinated solvent is preferred. The aprotic fluorinated solvent is a fluorinated solvent having no proton-donating property. As such aprotic fluorinated solvents, the following fluorinated compounds may be exemplified.

A polyfluoro aromatic compound such as perfluorobenzene, pentafluorobenzene, 1,3-bis(trifluoromethyl)benzene or 1,4-bis(trifluoromethyl)benzene; a polyfluorotrialkylamine compound such as perfluorotributylamine or perfluorotripropylamine; a polyfluorocycloalkane compound such as perfluorodecalin, perfluorocyclohexane or perfluoro(1,3,5-trimethylcyclohexane); a polyfluoro cyclic ether compound such as perfluoro(2-butyltetrahydrofuran); a perfluoropolyether; and a polyfluoroalkane compound such as perfluorohexane, perfluorooctane, perfluorodecane, perfluorododecane, perfluoro(2,7-dimethyloctane), 1,1,2-trichloro-1,2,2-trifluoroethane, 1,1,1-trichloro-2,2,2-trifluoroethane, 1,3-dichloro-1,1,2,2,3-pentafluoropropane, 1,1,1,3-tetrachloro-2,2,3,3-tetrafluoropropane, 1,1,3,4-tetrachloro-1,2,2,3,4,4-hexafluorobutane, perfluoro(1,2-dimethylhexane), perfluoro(1,3-dimethylhexane), 1,1,2,2,3,3,5,5,5-decafluoropentane, 1,1,1,2,2,3,3,4,4,5,5,6,6-tridecafluorohexane, 1,1,1,2,2,3,3,4,4,5,5,6,6,7,7,8,8-heptadecafluorooctane, 1,1,1,2,2,3,3,4,4,5,5,6,6,7,7,8,8,9,9,10,10-henicosafluorodecane, 1,1,1,2,2,3,3,4,4-nonafluorohexane, 1,1,1,2,2,3,3,4,4,5,5,6,6-tridecafluorooctane, 1,1,1,2,2,3,3,4,4,5,5,6,6,7,7,8,8-heptadecafluorodecane, 1,1,1,2,3,4,5,5,5-nonafluoro-4-(trifluoromethyl)pentane, 1,1,1,2,2,3,5,5,5-nonafluoro-4-(trifluoromethyl)pentane, 3,3-dichloro-1,1,1,2,2-pentafluoropropane or 1,3-dichloro-1,1,2,2,3-pentafluoropropane.

These aprotic fluorinated solvents may be used alone or in combination as a mixture.

As an aprotic fluorinated solvent, a hydrofluoroether (HFE) may also be mentioned in addition to the above solvents. As HFE, HFE represented by the formula $R^a$—O—$R^b$ (wherein $R^a$ is a $C_{5-12}$ linear or branched polyfluoroalkyl group which may have an ether bond, and $R^b$ is a $C_{1-5}$ linear or branched alkyl group or polyfluoroalkyl group) is preferred.

If the number of carbon atoms in $R^a$ is 4 or less, it is difficult to dissolve the polymer (A), and if the number of carbon atoms in $R^a$ exceeds 13, it is difficult to obtain such a solvent industrially. Therefore, the number of carbon atoms in $R^a$ is selected within a range of from 5 to 12. The number of carbon atoms in $R^a$ is preferably from 6 to 10, more preferably from 6 to 7, or from 9 to 10.

A polyfluoroalkyl group is a group having at least two of hydrogen atoms in an alkyl group substituted by fluorine atoms and includes a perfluoroalkyl group having all of hydrogen atoms in an alkyl group substituted by fluorine atoms, or a group having at least two of hydrogen atoms in an alkyl group substituted by fluorine atoms, and having at least one of hydrogen atoms in the alkyl group substituted by a halogen atom other than a fluorine atom. As the halogen atom other than a fluorine atom, a chlorine atom is preferred.

The polyfluoroalkyl group is preferably a group having at least 60%, more preferably at least 80%, in number of hydrogen atoms of the corresponding alkyl group substituted by fluorine atoms. A more preferred polyfluoroalkyl group is a perfluoroalkyl group.

In a case where $R^a$ has an ether bond, if the number of ether bonds is too many, the solubility will be thereby hindered, and accordingly, the number of ether bonds in $R^a$ is preferably from 1 to 3, more preferably from 1 to 2.

If the number of carbon atoms in $R^b$ is 6 or more, the solubility of the fluorinated cyclic structure-containing polymer will be substantially hindered. A preferred example of $R^b$ is a methyl group, an ethyl group, a trifluoroethyl group, a tetrafluoroethyl group, a tetrafluoropropyl group or the like.

If the molecular weight of HFE is too high, not only the viscosity of the coating fluid will be increased, but also the solubility of the polymer (A) will be lowered, and accordingly, it is preferably at most 1,000.

Further, in order to increase the solubility of the polymer (A), the fluorine content in HFE is preferably from 60 to 80 wt %. As preferred HFE, the following ones may be exemplified.

$F(CF_2)_4OCH_3$, $HCF_2CF_2OCH_2CF_3$, $HCF_2CF_2CH_2OCH_2CF_3$, $F(CF_2)_5OCH_3$, $F(CF_2)_6OCH_3$, $F(CF_2)_7OCH_3$, $F(CF_2)_8OCH_3$, $F(CF_2)_9OCH_3$, $F(CF_2)_{10}OCH_3$, $H(CF_2)_6OCH_3$, $(CF_3)_2CFCF(OCH_3)CF_2CF_3$, $F(CF_2)_3OCF(CF_3)CF_2OCH_3$, $F(CF_2)_3OCF(CF_3)CF_2OCF(CF_3)CF_2OCH_3$, $F(CF_2)_8OCH_2CH_2CH_3$, $(CF_3)_2CFCF_2CF_2OCH_3$ and $F(CF_2)_2O(CF_2)_4OCH_2CH_3$.

Among HFE, $(CF_3)_2CFCF(OCH_3)CF_2CF_3$ is particularly suitable as the solvent.

These HFE may be used alone or in combination as a mixture.

As the fluorinated organic solvent to dissolve the polymer (A), it is preferred to use only an aprotic fluorinated solvent, since it has a large dissolving power and is a good solvent.

Further, the boiling point of the fluorinated organic solvent to dissolve the polymer (A) is preferably from 65 to 220° C. When the boiling point of the fluorinated organic solvent is at least 100° C., a uniform film can easily be formed at the time of the coating.

As the solvent to dissolve the silane coupling agent, a protic fluorinated solvent is preferred. A protic fluorinated solvent is a fluorinated solvent having a proton-donating property. As such protic fluorinated solvents, the following ones may be exemplified.

A fluorinated alcohol such as trifluoroethanol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-(perfluoro-3-methylbutyl)ethanol, 2,2,3,3-tetrafluoro-1-propanol, 2,2,3,3,4,4,5,5-octafluoro-1-pentanol, 2,2,3,3,4,4,5,5,6,6,7,7-dodecafluoro-1-heptanol, 2,2,3,3,4,4,5,5,6,6,7,7,8,8-hexadecafluoro-1-nonanol, 1,1,1,3,3,3-hexafluoro-2-propanol or 1,3,3,4,4,4-hexafluoro-2-butanol.

A fluorinated carboxylic acid such as trifluoroacetic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, 1,1,2,2-tetrafluoropropanoic acid, 1,1,2,2,3,3,4,4-octafluoropentanoic acid, 1,1,2,2,3,3,4,4,5,5-dodecafluoroheptanoic acid or 1,1,2,2,3,3,4,4,5,5,6,6-hexadecafluorononanoic acid, an amide of such a fluorinated carboxylic acid, a fluorinated sulfonic acid such as trifluoromethanesulfonic acid or heptadecafluorooctanesulfonic acid, etc.

These protic fluorinated solvents may be used alone or in combination as a mixture of two or more of them.

The water content in the solvent to be used for the preparation of the coating fluid should better be small, and it is preferably at most 100 mass ppm, more preferably at most 20 mass ppm.

The concentration of the polymer (A) in the coating fluid is preferably from 0.1 to 30 mass %, more preferably from 0.5 to 20 mass %.

The solid content concentration in the coating fluid may be suitably set depending upon the thickness of the film to be formed. It is usually from 0.1 to 30 mass %, preferably from 0.5 to 20 mass %.

Here, for the solid content, the coating fluid having the mass measured is heated under ordinary pressure at 200° C. for one hour to distill the solvent off, and the mass of the remaining solid content is measured, whereupon the solid content is calculated.

The coating fluid may contain a tetraalkoxysilane such as tetramethoxysilane, tetraethoxysilane or tetrapropoxysilane in addition to the polymer (A), the silane coupling agent having an amino group and the above solvent.

The coating fluid is preferably obtained by preparing a polymer (A) solution having the polymer (A) dissolved in an aprotic fluorinated solvent and a silane coupling agent solution having the silane coupling agent dissolved in a protic fluorinated solvent, respectively, and then mixing the polymer (A) solution and the silane coupling agent solution.

<Coating Step>

In the coating step, a substrate is coated with the coating fluid obtained in the coating fluid-preparation step, to form a coating layer comprising the polymer (A) and the silane coupling agent.

The coating method may, for example, be a roll coater method, a casting method, a dipping method, a spin coating method, a casting-on-water method, a Langmuir•Blodgett method, a die coating method, an ink jet method or a spray coating method. Otherwise, a printing technique such as a relief printing method, a gravure printing method, a planographic printing method, a screen printing method or a flexo printing method, may also be used.

As the substrate to be coated with the coating fluid, any substrate may be used without selecting the material, so long as it is a substrate which can be earthed at the time of injecting an electric charge to the coating layer obtained by the coating. A preferred material may, for example, be an electrically conductive metal such as gold, platinum, copper, aluminum, chromium or nickel.

Further, it is also possible to use a material other than an electrically conductive metal, for example, an insulating material such as an inorganic material such as glass, or an organic polymer material such as polyethylene terephthalate, polyimide, polycarbonate or an acrylic resin, so long as it is one having its surface coated with an electroconductive metal film by a method such as sputtering, vapor deposition or wet coating.

Further, a semiconductor material such as silicon may also be used so long as it is one having similar surface treatment applied or one where the resistance value of the semiconductor material itself is low. The resistance value of the substrate material is preferably at most 0.1 $\Omega \cdot cm$, particularly preferably at most 0.01 $\Omega \cdot cm$, by volume resistivity.

The substrate may be a flat plate having a smooth surface or may be one having convexoconcave formed. Otherwise, it may have patterning applied in various shapes. In a case where the above insulating material is used as the substrate, convexoconcave or a pattern may be formed on the insulating material itself, or convexoconcave or a pattern may be formed on a metal layer applied on the surface.

The method for forming convexoconcave or a pattern on the substrate is not particularly limited, and a conventional method may be used. As the method for forming convexoconcave or a pattern, either a vacuum process or a wet system process may be employed. Specific examples of such a method include, as the vacuum process, a sputtering method via a mask and a vapor deposition method via a mask; and, as the wet system process, a roll coater method, a casting method, a dipping method, a spin coating method, a casting-on-water method, a Langmuir Blodgett method, a die coating method, an ink jet method, a spray coating method, etc. Further, a printing technique such as a relief printing method, a gravure printing method, a planographic printing method, a screen printing method or a flexo printing method may also be used. Further, as a method for forming fine convexoconcave or pattern, a nanoimprinting method or a photolithography method may also be used.

The shape and size of the coating layer may suitably be set depending on the shape and size of the desired electret. The electret is usually used in the form of a film having a thickness of from 1 to 200 μm. It is particularly preferred to employ it in the form of a film having a thickness of from 10 to 20 μm, from the viewpoint of the characteristics as an electret and processing efficiency.

In order to make the thickness after the thermal treatment to be from 1 to 200 μm, preferably from 10 to 20 μm, the thickness of the coating layer may be made to be from 2 to 220 μm, preferably from 12 to 25 μm.

Further, the substrate may be peeled after the electric charge-injection step.

<Thermal Treatment Step>

In the thermal treatment step, the above coating layer is thermally treated at a specific temperature to obtain a coating film (the coating film obtained by the thermal treatment of the coating layer may hereinafter sometimes be referred to as a coating film).

The thermal treatment preferably comprises a preliminary drying step and the main drying/baking step.

In the preliminary drying step, the solvent in the coating layer is evaporated as far as possible to preliminarily dry the coating layer. By this preliminary drying step, it is possible to prevent foaming of the film, surface roughening, non-uniformity, etc. in the subsequent main drying/baking step. The preliminary drying step is preferably carried out at a temperature of not higher than the boiling point of the solvent. Specifically, the temperature is preferably from 50 to 150° C., more preferably from 80 to 120° C. The time for the preliminary drying step is preferably from 0.1 to 5 hours, more preferably from 0.5 to 2 hours.

The main drying/baking step is carried out within a range of from 250° C. to 330° C. The temperature (baking temperature) in the main drying/baking step is preferably within a range of from 260° C. to 300° C., more preferably from 260 to 280° C. By adjusting the baking temperature to be the above temperature, it is possible to obtain an electret having a sufficient surface voltage and being excellent in the thermal stability. The time for the baking step is preferably from 0.5 to 5 hours, more preferably from 1 to 2 hours.

The atmosphere for the main drying/baking step may be an inert gas atmosphere or an air atmosphere, but an air atmosphere is preferred for the formation of amide bonds which will be described hereinafter. Further, the pressure is preferably ordinary pressure.

<Another Layer>

In the present invention, as the case requires, another layer may be laminated on the coating film obtained by thermal treatment of the coating layer comprising the above polymer (A) and the silane coupling agent. As another layer which may be laminated, a protective layer, a layer composed solely of the polymer (A) or a layer composed of an inorganic substance, may, for example, be mentioned.

Such another layer may be formed on the coating film after the thermal treatment step, or another layer may be formed at a stage where the preliminary drying step in the thermal treatment step has been completed and may be baked together with the coating layer comprising the polymer (A) and the silane coupling agent.

<Electric Charge-Injection Step>

As the step for injecting an electric charge to the above coating film, any method may be employed without selecting the means, so long as it is a common method for charging an insulating material. For example, it is possible to apply e.g. a corona discharge method disclosed in e.g. G. M. Sessler, Electrets Third Edition, pp 20, Chapter 2.2 "Charging and Polarizing Methods" (Laplacian Press, 1998), or an electron beam bombardment method, an ion beam bombardment method, a radiation method, a light irradiation method, a contact charging method or a liquid contact charging method. Especially for the electret of the present invention, it is preferred to employ a corona discharge method or an electron beam bombardment method.

Further, with respect to the temperature condition at the time of injecting an electric charge, it is preferred to carry out the injection at a temperature of at least the glass transition temperature of the polymer (A) from the viewpoint of the stability of the electric charge to be maintained after the injection, and it is particularly preferred to carry out the injection under a temperature condition at a level of the glass transition temperature+10 to 20° C. Further, with respect to the voltage to be applied at the time of injecting an electric charge, it is preferred to apply a high voltage so long as it is lower than the insulation breakdown voltage of the coating film of the polymer (A) and its composition. With the coating film in the present invention, it is possible to apply a high voltage of from ±6 to ±30 kV, and it is particularly preferred to apply a voltage of from ±8 to ±15 kV. Particularly, the polymer (A) to be used for the coating film is a fluorinated polymer, whereby a negative charge can be maintained more stably than a positive charge, and it is further preferred to apply a voltage of from −8 to −15 kV.

<Electrostatic Induction Conversion Device>

The electret of the present invention is useful for an electrostatic induction conversion device to covert electric energy to kinetic energy.

Such an electrostatic induction conversion device may, for example, be a vibration-type power-generating unit, a microphone, a speaker, an actuator or a sensor. The structure of such an electrostatic induction conversion device may be the same as a conventional one except that as the electret, the electret of the present invention is used.

As compared with conventional electrets, the electret obtained by the present invention has high stability with time and thermal stability of retained electric charge and has excellent charge retention performance.

Therefore, the electrostatic induction conversion device of the present invention comprising such an electret has such features that deterioration of properties is less likely to occur, and dependence of the properties on the environment is small.

<Operation Mechanism>

By using the composition comprising the polymer (A) and the silane coupling agent having an amino group, it is possible not only to improve the adhesion to a substrate of the coating film made of such a composition but also to improve the thermal stability of an electric charge maintained by the electret prepared therefrom.

The reason as to why the thermal stability is improved by incorporating the polymer (A) and the silane coupling agent having an amino group, is considered to be such that the polymer (A) and the silane coupling agent induce a nano phase separation to form a nano cluster structure derived from the silane coupling agent, and such a nano cluster structure will function as a site to store an electric charge in the electret.

The present inventors have found that the composition comprising the polymer (A) and the silane coupling agent having an amino group will have the thermal stability improved by the thermal treatment. It is considered that by the thermal treatment, the following reactions are promoted, whereby the thermal motion of a nano cluster structure derived from the silane coupling agent will be suppressed, and the nano cluster structure will be stabilized.

(1) A reaction wherein a carboxy group or an alkoxycarbonyl group of the polymer (A) is reacted with an amino group of the silane coupling agent, whereby the polymer (A) and the silane coupling agent will be bonded.

(2) A reaction wherein silane coupling agents are bonded to each other by a condensation reaction of alkoxysilyl groups.

The present inventors have conducted a further study, and they have found that when the temperature for the heat treatment is adjusted within the specific temperature range of the present invention, the effect for thermal stability is high and have confirmed from the infrared spectrum (hereinafter referred to as the IR spectrum) that such a specific temperature range corresponds to the above reactions (1) and (2).

That is, the thermal stability was high when the temperature for the heat treatment was within a range of from 250 to 330° C., and it was particularly high within a range of from 260 to 300° C.

Whereas, from an analysis of the IR spectrum, it has been found that the content (the residual amount) of the amino group is low as the temperature for the thermal treatment is high. This amino group is a group to be consumed by the reaction (1). Further, it has been found that the content (the residual amount) of an alkoxysilyl group is low as the temperature for the heat treatment is high. This alkoxysilyl group is a group to be consumed by the reaction (2). That is, it has been found that the reactions (1) and (2) are promoted as the temperature is high.

On the other hand, the content of the amide group to be formed by the reaction (1) has been found to be high when the temperature for the heat treatment is within a range of from 250 to 330° C., and is higher within a range of from 260 to 300° C. This indicates that if the temperature becomes too high, the formed amide group is likely to be thermally decomposed.

Further, the present inventors have confirmed a non-uniform structure corresponding to the above-described nano cluster structure by a small angle X-ray scattering analysis. And, they have found that as the temperature for the thermal treatment is high, the non-uniform structure tends to be large. This indicates the following state. That is, as the above reactions (1) and (2) are more promoted, the nano cluster structure derived from the silane coupling agent, which functions as a site to store electric charge becomes large. It is considered that as a result, the thermal stability of the charge-retention performance of the electret will be improved.

The present inventors have further found that as the molecular weight of the polymer (A) is large, the effect for improvement of the thermal stability tends to be large.

It is considered that as the molecular weight is large, the polymer (A) tends to hardly move, and as a result, also the nano cluster structure derived from the silane coupling agent which is present as surrounded by the polymer (A) tends to hardly undergo thermal motion.

From the foregoing, it is considered that the charge retention property of the electret will be improved by a synergistic effect of the large nano cluster structure and suppression of the thermal motion due to an increase of the weight average molecular weight of the polymer (A).

EXAMPLES

Now, specific cases of the above embodiment will be described as Examples. However, it should be understood that the present invention is by no means restricted to the following Examples.

In the following Examples, the volume resistivity is a value measured in accordance with ASTM D257.

The dielectric breakdown voltage is a value measured in accordance with ASTM D149.

The relative dielectric constant is a value measured in accordance with ASTM D150 at a frequency of 1 MHz.

The intrinsic viscosity [η] (30° C.) (unit: dl/g) is a value measured by an Ubbelohde viscometer at 30° C. by using perfluoro(2-butyltetrahydrofuran) as a solvent.

Of the polymer of perfluorobutenyl vinyl ether, the weight average molecular weight is a value calculated from the above intrinsic viscosity in accordance with the following relational formula disclosed in Journal of Chemical Society of Japan, 2001, NO. 12, P. 661.

Calculation formula disclosed in the literature: $[η]=1.7 \times 10^{-4} \times Mw^{0.60}$ where Mw is the weight average molecular weight.

Further, in each of the following Examples, the measurement of the film thickness was carried out by using optical interfero type film thickness measuring apparatus C10178 manufactured by Hamamatsu Photonics K.K.

Preparation Example 1

Preparation of Polymer Composition Solution M1

(1) Preparation of Polymer Solution 45 g of perfluorobutenyl vinyl ether ($CF_2$=$CFOCF_2CF_2CF$=$CF_2$), 240 g of deionized water, 16 g of methanol and 0.2 g of diisopropyl peroxydicarbonate powder ((($CH_3$)$_2$CHOCOO)$_2$) as a polymerization initiator were put into a pressure resistant glass autoclave having an internal capacity of 1 L. The interior of the system was flushed three times with nitrogen, and then, suspension polymerization was carried out at 40° C. for 23 hours. As a result, 40 g of polymer A1 was obtained. The infrared absorption spectrum of this polymer was measured, whereby no absorption was observed in the vicinity of 1,660 cm$^{-1}$ and 1,840 cm$^{-1}$ attributable to double bonds present in the monomer.

Polymer A1 was thermally treated in air at 250° C. for 8 hours and then immersed in water to obtain polymer A2 having a —COOH group as its terminal group. The IR spectrum of a compression-molded film of such a polymer was measured, whereby a characteristic absorption was observed at 1,775 and 1,810 cm$^{-1}$ attributable to the —COOH group. Further, the intrinsic viscosity [η] (30° C.) of this polymer was 0.24 dl/g, and the weight average molecular weight of the polymer quantified from such a result was 177,000. From these results, the product prepared by the above method was confirmed to be a fluorinated polymer having an alicyclic structure in its main chain and at the same time, having a carboxy group or an alkoxycarbonyl group as its terminal group.

The volume resistivity of polymer A2 was >10$^{17}$ Ω·cm, the dielectric breakdown voltage was 19 kV/mm, and the relative dielectric constant was 2.1.

With respect to polymer A2, differential scanning calorimetry (DSC) was carried out, whereby the glass transition temperature (Tg) of polymer A2 was 108° C.

In perfluorotributylamine, the above polymer A2 was dissolved at a concentration of 15 mass % to obtain polymer solution P1.

(2) Incorporation of Silane Coupling Agent

A solution having 10.6 g of perfluorotributylamine added to 84.6 g of the above polymer solution P1 was prepared. To this solution, a silane coupling agent solution (a solution having 0.4 g of γ-aminopropylmethyldiethoxysilane dissolved in 4.7 g of 2-(perfluorohexyl)ethanol) was mixed to obtain a uniform polymer composition solution M1.

<Preparation of Polymer Composition Solution>

Preparation Example 2

Preparation of Polymer Composition Solution M2

(1) Preparation of Polymer Solution 45 g of perfluorobutenyl vinyl ether ($CF_2$=$CFOCF_2CF_2CF$=$CF_2$), 240 g of deionized water, 7 g of methanol and 0.1 g of diisopropyl peroxydicarbonate powder ((($CH_3$)$_2$CHOCOO)$_2$) as a polymerization initiator were put into a pressure resistant glass autoclave having an internal capacity of 500 mL. The interior of the system was flushed three times with nitrogen, and then, suspension polymerization was carried out at 40° C. for 23 hours. As a result, 39 g of polymer B1 was obtained. The infrared absorption spectrum of this polymer was measured, whereby no absorption was observed in the vicinity of 1,660 cm$^{-1}$ and 1,840 cm$^{-1}$ attributable to double bonds present in the monomer.

Polymer B1 was thermally treated in air at 250° C. for 8 hours and then immersed in water to obtain polymer B2 having a —COOH group as its terminal group. The IR spectrum of a compression-molded film of such a polymer was measured, whereby a characteristic absorption was observed at 1,775 and 1,810 cm$^{-1}$ attributable to the —COOH group. Further, the intrinsic viscosity [η] (30° C.) of this polymer was 0.32 dl/g, and the weight average molecular weight of the polymer quantified from such a result was 287,000. From these results, the product prepared by the above method was confirmed to be a fluorinated polymer having an alicyclic structure in its main chain and at the same time, having a carboxy group or an alkoxycarbonyl group as its terminal group.

The volume resistivity of polymer B2 was >$10^{17}$ Ω·cm, the dielectric breakdown voltage was 19 kV/mm, and the relative dielectric constant was 2.1.

With respect to polymer B2, differential scanning calorimetry (DSC) was carried out, whereby the glass transition temperature (Tg) of polymer B2 was 108° C.

In perfluorotributylamine, the above polymer B2 was dissolved at a concentration of 11 mass % to obtain polymer solution P2.

(2) Incorporation of Silane Coupling Agent

To 76.3 g of the above polymer solution P2, a silane coupling agent solution (a solution having 0.3 g of γ-aminopropylmethyldiethoxysilane dissolved in 4.4 g of 2-(perfluorohexyl)ethanol) was mixed to obtain a uniform polymer composition solution M2.

Preparation Example 3

Preparation of Polymer Composition Solution M3

(1) Preparation of Polymer Solution 150 g of perfluorobutenyl vinyl ether ($CF_2$=$CFOCF_2CF_2CF$=$CF_2$), 650 g of deionized water and 0.3 g of diisopropyl peroxydicarbonate powder ((($CH_3$)$_2$CHOCOO)$_2$) as a polymerization initiator were put into a pressure resistant glass autoclave having an internal capacity of 2 L. The interior of the system was flushed three times with nitrogen, and then, suspension polymerization was carried out at 40° C. for 23 hours. As a result, 123 g of polymer C1 was obtained. The IR spectrum of this polymer was measured, whereby no absorption was observed in the vicinity of 1,660 $cm^{-1}$ and 1,840 $cm^{-1}$ attributable to double bonds present in the monomer.

Polymer B1 was thermally treated in air at 250° C. for 8 hours and then immersed in water to obtain polymer C2 having a —COOH group as its terminal group. The infrared absorption spectrum of a compression-molded film of such a polymer was measured, whereby a characteristic absorption was observed at 1,775 and 1,810 $cm^{-1}$ attributable to the —COOH group. Further, the intrinsic viscosity [η] (30° C.) of this polymer was 0.45 dl/g, and the weight average molecular weight of the polymer quantified from such a result was 506,000. From these results, the product prepared by the above method was confirmed to be a fluorinated polymer having an alicyclic structure in its main chain and at the same time, having a carboxy group or an alkoxycarbonyl group as its terminal group.

The volume resistivity of polymer C2 was >$10^{17}$ Ω·cm, the dielectric breakdown voltage was 19 kV/mm, and the relative dielectric constant was 2.1.

With respect to polymer C2, differential scanning calorimetry (DSC) was carried out, whereby the glass transition temperature (Tg) of polymer C2 was 108° C.

In perfluorotributylamine, the above polymer C2 was dissolved at a concentration of 9 mass % to obtain polymer solution P3.

(2) Incorporation of Silane Coupling Agent

To 44.4 g of the above polymer solution P3, a silane coupling agent solution (a solution having 0.1 g of γ-aminopropylmethyldiethoxysilane dissolved in 2.4 g of 2-(perfluorohexyl)ethanol) was mixed to obtain a uniform polymer composition solution M3.

Preparation Example 4

Preparation of Polymer Composition Solution M4

(1) Preparation of Polymer Solution

Polymer (A1) obtained in Preparation Example 1 was thermally treated in air at 250° C. for 8 hours and then immersed in methanol to obtain polymer A3 having a —$COOCH_3$ group as its terminal group. The IR spectrum of a compression-molded film of the polymer was measured, whereby a characteristic absorption was observed at 1,795 $cm^{-1}$ attributable to the —$COOCH_3$ group. Further, the intrinsic viscosity [η] (30° C.) of this polymer is 0.24 dl/g, and the weight average molecular weight of the polymer quantified from this result was 177,000. From these results, the product prepared by the above method was confirmed to be a fluorinated polymer having an alicyclic structure in its main chain and at the same time, having a carbonyl group or an alkoxycarbonyl group as its terminal group.

The volume resistivity of polymer A3 was >$10^{17}$ Ω·cm, the dielectric breakdown voltage was 19 kV/mm, and the relative dielectric constant was 2.1.

With respect to polymer A3, differential scanning calorimetry (DSC) was carried out, whereby the glass transition temperature (Tg) of polymer A3 was 108° C.

In perfluorotributylamine, the above polymer A3 was dissolved at a concentration of 9 mass % to obtain polymer solution P4.

(2) Incorporation of Silane Coupling Agent

To 25.1 g of the above polymer solution P4, a silane coupling agent solution (a solution having 0.07 g of γ-aminopropylmethyldiethoxysilane dissolved in 1.2 g of 2-(perfluorohexyl)ethanol) was mixed to obtain a uniform polymer composition solution M4.

Preparation Example 5

Preparation of Polymer Composition Solution M5

(1) Preparation of Polymer Solution

In accordance with the procedure disclosed in Example 2 in Japanese Patent No. 3,053,657, perfluoro(butenyl vinyl ether) and perfluoro(2,2-dimethyl-1,3-dioxol) (hereinafter referred to as PDD) were polymerized to obtain polymer D1.

The IR spectrum of polymer D1 was measured, and from the absorbance of absorption at 1,930 $cm^{-1}$, the repeating unit based on PDD (PDD content) contained in the polymer D1 was determined to be 52 mol %.

Such polymer D1 was thermally treated in air at 330° C. for 5 hours and then immersed in water to obtain polymer D2.

With respect to such polymer D2, differential scanning calorimetry (DSC) was carried out, whereby the glass transition temperature (Tg) of polymer D2 was 149° C.

Further, a compression-molded film of the polymer D2 was prepared, and the IR spectrum of such a molded film was measured, whereby the characteristic absorption was observed at 1,775 $cm^{-1}$ and 1,810 $cm^{-1}$ attributable to the —COOH group.

Further, the intrinsic viscosity [η] (30° C.) of polymer D2 was 0.36 dl/g, the volume resistivity was >$10^{17}$ Ω·cm, and the relative dielectric constant was 2.0.

Then, in perfluorotributylamine, the above polymer D2 was dissolved at a concentration of 11 mass % to obtain polymer solution P5.

(2) Incorporation of Silane Coupling Agent

A solution having 14 g of perfluorotributylamine added to 76.9 g of the above polymer solution P5 was prepared. To such a solution, a silane coupling agent solution (a solution having 0.4 g of γ-aminopropylmethyldiethoxysilane dissolved in 4.4 g of 2-(perfluorohexyl)ethanol) was mixed to obtain a uniform polymer composition solution M5.

Preparation Example 6

Preparation of Polymer Composition Solution M6

(1) Preparation of Polymer Solution

In perfluorotributylamine, commercially available fluorinated polymer Teflon-AF1600 (manufactured by Du Pont Kabushiki Kaisha) was dissolved at a concentration of 8 mass % to obtain polymer solution P6.

With respect to this Teflon-AF1600 (manufactured by Du Pont Kabushiki Kaisha), the infrared absorption spectrum of a compression-molded film of such a polymer was measured, whereby the characteristic absorption was observed at 1,810 $cm^{-1}$ attributable to the —COOH group. Further, the intrinsic viscosity [η](30° C.) of the polymer was 1.05 dl/g, the volume resistivity was $>10^{17}$ Ω·cm, and the relative dielectric constant was 1.9. Further, with respect to such a polymer, differential scanning calorimetry (DSC) was carried out, whereby the glass transition temperature (Tg) of the polymer was 164° C.

(2) Incorporation of Silane Coupling Agent

To 53 g of the above polymer solution P6, a silane coupling agent solution (a solution having 0.13 g of γ-aminopropylmethyldiethoxysilane dissolved in 2.6 g of 2-(perfluorohexyl) ethanol) was mixed to obtain a uniform polymer composition solution M6.

Preparation Example 7

Preparation of Polymer Composition Solution M7

(1) Preparation of Polymer Solution 15 g of $CF_2$=$CFCF_2CF(CF_3)OCF$=$CF_2$, 80 g of deionized water, 2.4 g of methanol and 38 g of perfluorobenzoyl peroxide as a polymerization initiator were put into a stainless steel autoclave having an internal capacity of 200 mL. Such an autoclave was flushed with nitrogen and then heated until the internal temperature of the autoclave became 70° C., followed by polymerization for 20 hours. The obtained polymer was washed with deionized water and methanol and then dried at 200° C. for one hour. As a result, 12 g of polymer E1 was obtained. The IR spectrum of this polymer E1 was measured, whereby no absorption was observed at 1,660 $cm^{-1}$ or 1,840 $cm^{-1}$ attributable to the double bond present in the monomer.

The intrinsic viscosity (30° C.) of the polymer E1 was measured, and found to be 0.31 dl/g.

Then, the polymer E1 was thermally treated in air at 250° C. for 8 hours and then immersed in water to obtain polymer E2 having a —COOH group as its terminal group. The IR spectrum of a compression-molded film of the polymer was measured, whereby the characteristic absorption was observed at 1,775 $cm^{-1}$ and 1,810 $cm^{-1}$ attributable to the —COOH group.

The volume resistivity of the polymer E2 was $>10^{17}$ Ω·cm, and the relative dielectric constant was 2.0. Further, the glass transition temperature measured by differential scanning calorimetry (DSC) was 124° C.

In perfluorotributylamine, the above polymer E2 was dissolved at a concentration of 15 mass % to obtain polymer solution P7.

(2) Incorporation of Silane Coupling Agent

A solution having 4.6 g of perfluorotributylamine added to 24 g of the above polymer solution P7 was prepared. To such a solution, a silane coupling agent solution (a solution having 0.1 g of γ-aminopropylmethyldiethoxysilane dissolved in 1.3 g of 2-(perfluorohexyl)ethanol) was mixed to obtain a uniform polymer composition solution M7.

Preparation Example 8

Preparation of Polymer Composition Solution M8

A solution having 6.3 g of perfluorotributylamine added to 69.9 g of the polymer solution P1 in the above Preparation Example 1, was prepared. To such a solution, a silane coupling agent solution (a solution having 0.3 g of γ-aminopropylmethyldiethoxysilane dissolved in 3.5 g of 2-(perfluorohexyl)ethanol) was mixed to obtain a uniform polymer composition solution M8.

Preparation Example 9

Preparation of Polymer Composition Solution M9

A solution having 6.8 g of perfluorotributylamine added to 69.3 g of the polymer solution P1 in the above Preparation Example 1, was prepared. To such a solution, a silane coupling agent solution (a solution having 0.4 g of N-(β-aminoethyl)-γ-aminopropyltriethoxysilane dissolved in 3.5 g of 2-(perfluorohexyl)ethanol) was mixed to obtain a uniform polymer composition solution M9.

Preparation Example 10

Preparation of Polymer Composition Solution M10

To 44.9 g of the polymer solution P1 in the above Preparation Example 1, a silane coupling agent solution (a solution having 0.2 g of N-(β-aminoethyl)-γ-aminopropylmethyldimethoxysilane dissolved in 2.5 g of 2-(perfluorohexyl) ethanol) was mixed to obtain a uniform polymer composition solution M10.

Preparation Example 11

Preparation of Polymer Composition Solution M11

To 38.2 g of the polymer solution P1 in the above Preparation Example 1, a silane coupling agent solution (a solution having 0.2 g of m-aminophenyltrimethoxysilane dissolved in 5.0 g of 2-(perfluorohexyl)ethanol) was mixed to obtain a uniform polymer composition solution M11.

Preparation Example 12

Preparation of Polymer Composition Solution M12

To 76.7 g of the polymer solution P2 in the above Preparation Example 2, a silane coupling agent solution (a solution having 0.3 g of N-(β-aminoethyl)-γ-aminopropylmethyldimethoxysilane dissolved in 4.3 g of 2-(perfluorohexyl) ethanol) was mixed to obtain a uniform polymer composition solution M12.

Preparation Example 13

Preparation of Polymer Composition Solution M13

To 44.5 g of the polymer solution P2 in the above Preparation Example 2, a silane coupling agent solution (a solution having 0.2 g of m-aminophenyltrimethoxysilane dissolved in 6.5 g of 2-(perfluorohexyl)ethanol) was mixed to obtain a uniform polymer composition solution M13.

Test Example 1

Example 1

(1) Preparation of Electret

A copper substrate (3 cm square, thickness: 300 μm) was coated with the polymer composition solution M1 by a spin coating method, followed by pretreatment at 100° C. for one hour, and then, thermal treatment was carried out at a thermal treatment temperature of 300° C. for one hour to form a coating film having a thickness of 15 μm.

To this coating film, injection of electric charge was carried out by means of a corona charging equipment of which a schematic diagram is shown in FIG. 1, to obtain an electret in Example 1.

This corona charging equipment is designed so that by using the above copper substrate (hereinafter referred to as "the copper substrate 10") having the coating film 11 (hereinafter referred to as "the coating film 11") as an electrode, a high voltage can be applied between a corona needle 14 and the copper substrate 10 by a DC high voltage power source 12 (HAR-20R5, manufactured by Matsusada Precision Inc.). Further, it is designed that to a grid 16, a grid voltage can be applied from a grid power source 18. It is thereby designed that negative ions discharged from the corona needle 14 are homogenized by the grid 16 and then showered down on the coating film 11, whereby electric charge is injected.

Further, in order to stabilize the electric charge injected to the coating film 11, it is designed that by a hotplate 19, the coating film 11 can be heated to a temperature of at least the glass transition temperature during the electric charge-injection step. Here, 17 is an ammeter.

In Example 1, the heating temperature of the coating film 11 by the hotplate 19 was adjusted to 120° C. which is higher by 12° C. than the glass transition temperature (Tg: 108° C. in the case of polymer A2) of the polymer (polymer A2) used.

And, a high voltage of −8 kV was applied for three minutes between the corona needle 14 and the copper substrate 10 in the atmospheric air atmosphere. Further, during the period, the grid voltage was set to be −1,100 V.

(2) Measurement of Surface Voltage

With respect to the electret thus prepared, as intended for a solder reflow step required in an application to ECM, the following respective surface voltages were measured, and the surface voltage residual ratio was obtained. The results are shown in Table 1.

Figure 2:
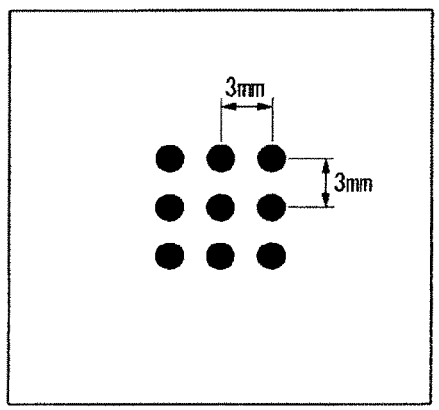
FIG. 2 is a diagram showing set positions for measuring points for surface voltages.

Here, the value of each surface voltage in Table 1 is an average value obtained by measuring surface voltages at 9 measuring points (set in a lattice arrangement for every 3 mm from the center of the film, as shown in FIG. 2) of each electret by means of a surface voltmeter (model 279, manufactured by Monroe Electronics Inc.) (the same applies in Table 2 et seq.).

(Initial Surface Voltage)

The surface voltage at the time when an electret immediately after injecting electric charge by corona charging was returned to ordinary temperature (25° C., the same applies hereinafter).

(Surface Voltage Before Heating at 260° C.)

The surface voltage at the time when after storing the electret after the measurement of the initial surface voltage for 25 hours under a condition of 20° C. under a relative humidity of 60%, the electret was returned to ordinary temperature.

(Surface Voltage after Heating at 260° C.)

The surface voltage at the time when after exerting a thermal history of 10 minutes in an oven adjusted to 260° C., to the electret after measuring the surface voltage before heating at 260° C., the electret was returned to ordinary temperature.

(Surface Voltage Residual Ratio)

The ratio of the surface voltage after heating at 260° C. to the surface voltage before heating at 260° C.

Examples 2 to 7 and Comparative Examples 1 to 5

(1) Preparation of Electrets

An electret in each Example or Comparative Example was prepared in the same manner as in Example 1 except that the polymer composition solution was the polymer composition solution in Tables 1 and 2, and the temperature for the thermal treatment was adjusted to the value in Tables 1 and 2.

With respect to each electret thus prepared, the initial surface voltage, the surface voltage before heating at 260° C. and the surface voltage after heating at 260° C. were measured, and the surface voltage residual ratio was obtained, in the same manner as in Example 1. The results are shown in Tables 1 and 2.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Polymer composition solution | M1 | M1 | M1 | M1 | M1 | M1 | M1 | M$^1$ |
| Temperature for thermal treatment (° C.) | 300 | 280 | 260 | 250 | 330 | 240 | 230 | 200 |
| Grid voltage (V) | −1,100 | −1,100 | −1,100 | −1,100 | −1,100 | −1,100 | −1,100 | −1,100 |
| Initial surface voltage (V) | −1,175 | −1,188 | −1,186 | −1,175 | −1,174 | −1,184 | −1,184 | −1,177 |
| Surface voltage before heating at 260° C. (V) | −1,168 | −1,182 | −1,179 | −1,175 | −1,163 | −1,176 | −1,176 | −1,170 |
| Surface voltage after heating at 260° C. (V) | −497 | −392 | −359 | −231 | −338 | −152 | −128 | −50 |
| Surface voltage residual ratio (%) | 43 | 33 | 30 | 20 | 29 | 13 | 11 | 4 |

TABLE 2

|  | Ex. 6 | Ex. 7 | Comp. Ex. 4 | Comp. Ex. 5 |
|---|---|---|---|---|
| Polymer composition solution | M2 | M3 | M2 | M3 |
| Temperature for thermal treatment (° C.) | 280 | 280 | 200 | 200 |
| Grid voltage (V) | −1,100 | −1,100 | −1,100 | −1,100 |
| Initial surface voltage (V) | −1,183 | −1,105 | −1,186 | −1,056 |
| Surface voltage before heating at 260° C. (V) | −1,172 | −1,097 | −1,159 | −1,051 |
| Surface voltage after heating at 260° C. (V) | −544 | −520 | −61 | −76 |
| Surface voltage residual ratio (%) | 46 | 47 | 5 | 7 |

When the surface voltage residual ratios shown in Table 1 are compared, it is evident that the surface voltage residual ratio in each of Examples wherein the temperature for the thermal treatment was from 250 to 330° C., exceeded the surface voltage residual ratios in Comparative Examples wherein the temperature for the thermal treatment was less than 250° C. The surface voltage residual ratio was particularly high when the temperature for the thermal treatment was from 260 to 300° C.

Further, when the surface voltage residual ratios shown in Table 2 are compared between Examples wherein the same polymer composition solution was used, the surface voltage residual ratio in each of Examples wherein the temperature for the thermal treatment was 280° C., exceeded the surface voltage residual ratios in Comparative Examples wherein the temperature for the thermal treatment was 200° C.

Further, in each Example, the surface voltage (absolute value) after heating at 260° C. exceeded 200 V as the value required for ECM.

Test Example 2

Examples 8 to 19 and Comparative Examples 11 to 15

(1) Preparation of Electrets
An electret in each Example or Comparative Example was prepared in the same manner as in Example 1 except that the polymer composition solution was the polymer composition solution in Tables 3 to 5, the temperature for the thermal treatment and the grid voltage were adjusted to the values in Tables 3 to 5, and the temperature for heating the coating film in the charge-injection step was adjusted to the following temperature which is higher by 12° C. than the glass transition temperature of the polymer used.

Examples 8 to 15, 18 and 19, and Comparative Examples 6 to 11, 14 and 15

Glass transition temperature of the polymer used: 108° C.
Temperature for heating the coating film: 120° C.

Example 16 and Comparative Example 12

Glass transition temperature of the polymer used: 149° C.
Temperature for heating the coating film: 161° C.

Example 17 and Comparative Example 13

Glass transition temperature of the polymer used: 124° C.
Temperature for heating the coating film: 136° C.

(2) Measurement of Surface Voltages
With respect to each electret thus prepared, as intended for an electrostatic induction conversion device for vehicles, the following respective surface voltages were measured, and the surface voltage residual ratio was obtained in the same manner as in Example 1. The results are shown in Tables 3 to 5.
(Initial Surface Voltage)
The surface voltage at the time when an electret immediately after injecting electric charge by corona charging was returned to ordinary temperature.
(Surface Voltage Before Heating at 125° C.)
The surface voltage at the time when after storing the electret after the measurement of the initial surface voltage for a storage time as shown in Tables 3 to 5 under a condition of 20° C. under a relative humidity of 60%, the electret was returned to ordinary temperature.
(Surface Voltage after Heating at 125° C.)
The surface voltage at the time when after exerting a thermal history of 100 hours in an oven adjusted to 125° C., to the electret after measuring the surface voltage before heating at 125° C., the electret was returned to ordinary temperature.
(Surface Voltage Residual Ratio)
The ratio of the surface voltage after heating at 125° C. to the surface voltage before heating at 125° C.

TABLE 3

|  | Ex. 8 | Ex. 9 | Ex. 10 | Ex. 11 | Ex. 12 | Comp. Ex. 6 | Comp. Ex. 7 | Comp. Ex. 8 |
|---|---|---|---|---|---|---|---|---|
| Polymer composition solution | M1 | M1 | M1 | M1 | M1 | M1 | M1 | M1 |
| Temperature for thermal treatment (° C.) | 300 | 280 | 260 | 250 | 330 | 240 | 230 | 200 |
| Grid voltage (V) | −1,100 | −1,100 | −1,100 | −1,100 | −1,100 | −1,100 | −1,100 | −1,100 |
| Initial surface voltage (V) | −1,176 | −1,182 | −1,186 | −1,160 | −1,180 | −1,183 | −1,180 | −1,178 |
| Storage time (hr) | 120 | 120 | 120 | 120 | 70 | 120 | 120 | 120 |
| Surface voltage before heating at 125° C. (V) | −1,165 | −1,166 | −1,177 | −1,149 | −1,168 | −1,169 | −1,168 | −1,167 |
| Surface voltage after heating at 125° C. (V) | −1,012 | −983 | −944 | −870 | −927 | −835 | −803 | −664 |
| Surface voltage residual ratio (%) | 87 | 84 | 80 | 76 | 79 | 71 | 69 | 57 |

TABLE 4

|  | Ex. 13 | Ex. 14 | Ex. 15 | Ex. 16 | Ex. 17 | Ex. 18 | Ex. 19 |
|---|---|---|---|---|---|---|---|
| Polymer composition solution | M2 | M3 | M4 | M5 | M7 | M8 | M9 |
| Temperature for thermal treatment (° C.) | 280 | 280 | 280 | 280 | 280 | 280 | 280 |
| Grid voltage (V) | −600 | −600 | −600 | −600 | −600 | −600 | −600 |
| Initial surface voltage (V) | −1,282 | −1,278 | −1,177 | −1,217 | −1,119 | −1,482 | −1,437 |
| Storage time (hr) | 350 | 650 | 210 | 350 | 500 | 430 | 620 |
| Surface voltage before heating at 125° C. (V) | −1,258 | −1,255 | −1,163 | −1,145 | −1,092 | −1,375 | −1,329 |
| Surface voltage after heating at 125° C. (V) | −1,117 | −1,160 | −726 | −1,087 | −1,017 | −969 | −1,073 |
| Surface voltage residual ratio (%) | 89 | 92 | 62 | 95 | 93 | 70 | 81 |

TABLE 5

|  | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|
| Polymer composition solution | M2 | M3 | M4 | M5 | M7 | M8 | M9 |
| Temperature for thermal treatment (° C.) | 200 | 200 | 200 | 200 | 200 | 200 | 200 |
| Grid voltage (V) | −600 | −600 | −600 | −600 | −600 | −600 | −600 |
| Initial surface voltage (V) | −1,324 | −1,401 | −1,178 | −1,179 | −1,039 | −1,346 | −1,345 |
| Storage time (hr) | 350 | 650 | 210 | 350 | 570 | 480 | 650 |
| Surface voltage before heating at 125° C. (V) | −1,301 | −1,267 | −1,162 | −1,062 | −996 | −1,278 | −1,328 |
| Surface voltage after heating at 125° C. (V) | −828 | −791 | −438 | −889 | −806 | −728 | −668 |
| Surface voltage residual ratio (%) | 64 | 62 | 38 | 84 | 81 | 57 | 50 |

When the surface voltage residual ratios shown in Table 3 are compared, it is evident that the surface voltage residual ratio in each of Examples wherein the temperature for the thermal treatment was from 250 to 330° C., exceeded the surface voltage residual ratios in Comparative Examples wherein the temperature for the thermal treatment was less than 250° C. The surface voltage residual ratio was particularly high when the temperature for the thermal treatment was from 260 to 300° C.

Further, when the surface voltage residual ratios shown in Tables 4 and 5 are compared between Examples wherein the same polymer composition solution was used, it is evident that the surface voltage residual ratio in each of Examples wherein the temperature for the thermal treatment was from 260 to 280° C., exceeded the surface voltage residual ratios in Comparative Examples wherein the temperature for the thermal treatment was 200° C.

Test Example 3

Examples 20 to 32 and Comparative Examples 16 to 26

(1) Preparation of Electrets

An electret in each Example or Comparative Example was prepared in the same manner as in Example 1 except that the polymer composition solution was the polymer composition solution in Tables 6 to 8, the temperature for the thermal treatment and the grid voltage were adjusted to the values in Tables 6 to 8, and the temperature for heating the coating film in the electric charge injection step was adjusted to the following temperature which is higher by 12° C. than the glass transition temperature of the polymer used.

(Examples 20 to 27, 31 and 32, and Comparative Examples 16 to 21, 25 and 26)

Glass transition temperature of the polymer used: 108° C.
Temperature for heating the coating film: 120° C.

(Example 28 and Comparative Example 22)

Glass transition temperature of the polymer used: 149° C.
Temperature for heating the coating film: 161° C.

(Example 29 and Comparative Example 23)

Glass transition temperature of the polymer used: 164° C.
Temperature for heating the coating film: 176° C.

(Example 30 and Comparative Example 24)

Glass transition temperature of the polymer used: 124° C.
Temperature for heating the coating film: 136° C.

(2) Measurement of Surface Voltage

With respect to each electret thus prepared, the following respective surface voltages were measured in the same manner as in Example 1. The results are shown in Tables 6 to 8.

(Initial Surface Voltage)

The surface voltage at the time when an electret immediately after injecting electric charge by corona charging was returned to ordinary temperature.

(Surface Voltage Before TSD Test)

The surface voltage at the time when after storing the electret after measuring the initial surface voltage for a storage time as shown in Tables 6 to 8 under a condition of 20° C. under a relative humidity of 60%, the electret was returned to ordinary temperature.

(3) TSD Test

Figure 3:
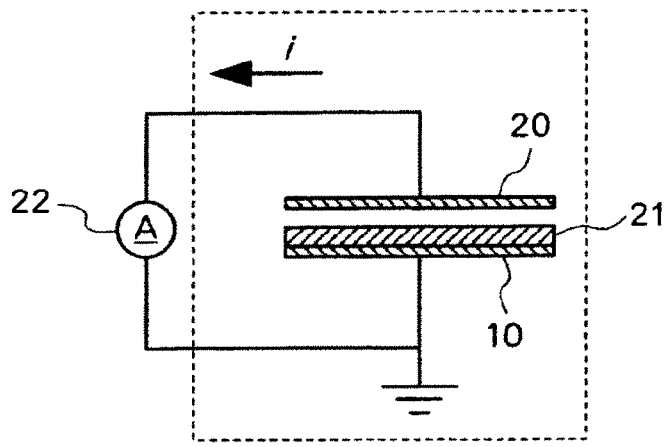
FIG. 3 is a schematic diagram illustrating an equipment used for a thermal stability test.

With respect to the electrets (hereinafter referred to as "electret 21") after measuring the surface voltages before TSD test, a TSD test was carried out by the following procedure by using an equipment, of which a schematic diagram is shown in FIG. 3.

Firstly, as shown in FIG. 3, a counter electrode 20 was disposed to face an electret 21 on a copper substrate 10 (the same as the copper substrate 10 in FIG. 1).

Then, the temperature at the portion shown by dashed lines in FIG. 3 was raised at a constant rate (1° C./min) by heating by means of a heater, and the amount of electric charge discharged from each electret 21 was measured as a current value i flowing from the counter electrode 20 by ammeter 22 (a fine ammeter (model 6517A manufactured by Keithley)), and the discharge initiation temperature and the discharge peak temperature were obtained. The results are shown in Tables 6 to 8.

Here, the discharge peak temperature represents a temperature at which the current value detected at the time of the discharge becomes maximum, and the discharge initiation temperature represents a temperature at the time when the current value obtained by the following formula (the current value at the initiation of the discharge) was detected by the ammeter 22.

Current value at the initiation of the discharge={(current value at the discharge peak temperature)−(current value before the discharge)}×0.1+(current value before the discharge)

The TSD test is a test by a method so-called a Thermal Stimulated Discharge method (hereinafter referred to as a TSD method). In this method, a capacitor will be formed by the electret 21 and the counter electrode 20. Accordingly, when the electret 21 is heated, the electric charge trapped in the film tends to be unstable, and if electric charge in the vicinity of the surface diminishes by e.g. diffusion, the electric charge stored in the counter electrode 20 will also decrease. Thus, by measuring the electric current value flowing from the counter electrode 20, the thermal stability of each electret can be evaluated.

In the test by the TSD method, both of the discharge peak temperature and the discharge initiation temperature are important, but the discharge initiation temperature is particularly important. It is said that the higher these temperatures, the higher the thermal stability of the electret.

TABLE 6

|  | Ex. 20 | Ex. 21 | Ex. 22 | Ex. 23 | Ex. 24 | Comp. Ex. 16 | Comp. Ex. 17 | Comp. Ex. 18 |
| --- | --- | --- | --- | --- | --- | --- | --- | --- |
| Polymer composition solution | M1 | M1 | M1 | M1 | M1 | M1 | M1 | M1 |
| Temperature for thermal treatment (° C.) | 300 | 280 | 260 | 250 | 330 | 240 | 230 | 200 |
| Grid voltage (V) | −600 | −600 | −600 | −600 | −600 | −600 | −600 | −600 |
| Initial surface voltage (V) | −1,221 | −1,290 | −1,229 | −1,212 | −1,169 | −1,184 | −1,468 | −1,209 |
| Storage time (hr) | 350 | 70 | 90 | 120 | 24 | 95 | 190 | 140 |
| Surface voltage before TSD heating (V) | −1,208 | −1,262 | −1,124 | −1,204 | −1,159 | −1,204 | −1,434 | −973 |
| Discharge peak temperature (° C.) | 176 | 223 | 215 | 204 | 166 | 202 | 179 | 183 |
| Discharge initiation temperature (° C.) | 162 | 153 | 159 | 146 | 159 | 145 | 134 | 135 |

TABLE 7

|  | Ex. 25 | Ex. 26 | Ex. 27 | Ex. 28 | Ex. 29 | Ex. 30 | Ex. 31 | Ex. 32 |
| --- | --- | --- | --- | --- | --- | --- | --- | --- |
| Polymer composition solution | M2 | M3 | M4 | M5 | M6 | M7 | M8 | M9 |
| Temperature for thermal treatment (° C.) | 280 | 280 | 280 | 280 | 280 | 280 | 280 | 280 |
| Grid voltage (V) | −600 | −600 | −600 | −600 | −600 | −600 | −600 | −600 |
| Initial surface voltage (V) | −1,282 | −1,278 | −1,177 | −1,031 | −818 | −1,108 | −971 | −1,115 |
| Storage time (hr) | 350 | 650 | 210 | 1,000 | 700 | 1,120 | 360 | 190 |
| Surface voltage before TSD heating (V) | −982 | −1,204 | −1,089 | −916 | −549 | −1,100 | −705 | −1,080 |
| Discharge peak temperature (° C.) | 251 | 238 | 205 | 247 | 242 | 239 | 238 | 212 |
| Discharge initiation temperature (° C.) | 178 | 172 | 144 | 175 | 184 | 168 | 161 | 162 |

TABLE 8

|  | Comp. Ex. 19 | Comp. Ex. 20 | Comp. Ex. 21 | Comp. Ex. 22 | Comp. Ex. 23 | Comp. Ex. 24 | Comp. Ex. 25 | Comp. Ex. 26 |
| --- | --- | --- | --- | --- | --- | --- | --- | --- |
| Polymer composition solution | M2 | M3 | M4 | M5 | M6 | M7 | M8 | M9 |
| Temperature for thermal treatment (° C.) | 200 | 200 | 200 | 200 | 200 | 200 | 200 | 200 |

TABLE 8-continued

|  | Comp. Ex. 19 | Comp. Ex. 20 | Comp. Ex. 21 | Comp. Ex. 22 | Comp. Ex. 23 | Comp. Ex. 24 | Comp. Ex. 25 | Comp. Ex. 26 |
| --- | --- | --- | --- | --- | --- | --- | --- | --- |
| Grid voltage (V) | −600 | −600 | −600 | −600 | −600 | −600 | −600 | −600 |
| Initial surface voltage (V) | −1,324 | −1,401 | −1,178 | −939 | −1,168 | −1,183 | −1,094 | −1,314 |
| Storage time (hr) | 350 | 650 | 210 | 70 | 700 | 550 | 260 | 550 |
| Surface voltage before TSD heating (V) | −1,149 | −1,025 | −1,101 | −927 | −1,163 | −1,170 | −1,071 | −1,117 |
| Discharge peak temperature (° C.) | 189 | 192 | 170 | 203 | 182 | 189 | 180 | 172 |
| Discharge initiation temperature (° C.) | 147 | 151 | 133 | 158 | 147 | 155 | 139 | 140 |

When the discharge initiation temperatures shown in Table 6 are compared, it is evident that the discharge initiation temperature in each of Examples wherein the temperature for the thermal treatment was from 250 to 330° C., exceeded the discharge initiation temperature in Comparative Examples wherein the discharge initiation temperatures was less than 250° C.

Further, when the discharge initiation temperatures shown in Tables 7 and 8 are compared between Examples wherein the same polymer composition solution was used, it is evident that the discharge initiation temperature in each of Examples wherein the temperature for the thermal treatment was from 260 to 280° C., exceeded the discharge initiation temperatures in Comparative Examples wherein the temperature for the thermal treatment was 200° C.

Test Example 4

[Measurement of IR Spectrum]

On a polytetrafluoroethylene sheet (hereinafter referred to as a "PTFE sheet"), the polymer composition solution M1 was cast to form a film, which was subjected to pretreatment at 100° C. for one hour and then thermally treated for one hour at the heat treatment temperature disclosed in Table 7 and peeled from the PTFE sheet to obtain a cast film having a thickness of from 50 to 100 μm.

The infrared absorption spectrum of each cast film was measured by means of AVATAR370FT-IR manufactured by Thermo Nicolet, whereupon the areas of the absorption at 1,670 cm$^{-1}$ (hereinafter referred to as peak (α)) derived from the amino group of γ-aminopropylmethyldiethoxysilane (N—H bending vibration), the absorption at 1,730 cm$^{-1}$ (hereinafter referred to as peak (β)) derived from the carbonyl group of an amide group formed by a reaction of γ-aminopropylmethyldiethoxysilane with the terminal group COOH group of polyperfluorobutenyl vinyl ether A2, and the absorption at from 2,800 cm$^{-1}$ to 3,000 cm$^{-1}$ (hereinafter referred to as peak (γ)) derived from the C—H bond of the ethoxy group of γ-aminopropylmethyldiethoxysilane, were quantified.

Peak area-standardized values obtained by standardizing the areas of peaks (α), (β) and (γ) by the area of the absorption at from 2,000 cm$^{-1}$ to 2,700 cm$^{-1}$ (hereinafter referred to as peak (δ)) derived from CF$_2$ of polyperfluorobutenyl vinyl ether A2 by the following formula, are shown in Table 9 and FIG. 4.

(Peak area-standardized value)=(area of either peak (α), (β) or (γ))/(area of peak (δ))×100

TABLE 9

|  | Test Ex. 7 | Test Ex. 6 | Test Ex. 5 | Test Ex. 4 | Test Ex. 3 | Test Ex. 2 | Test Ex. 1 | Test Ex. 8 |
| --- | --- | --- | --- | --- | --- | --- | --- | --- |
| Polymer composition solution | M1 | M1 | M1 | M1 | M1 | M1 | M1 | M1 |
| Temperature for thermal treatment (° C.) | 200 | 230 | 240 | 250 | 260 | 280 | 300 | 330 |
| Peak area-standardized value (α) | 5.6 | 1.3 | 1.2 | 1.0 | 0.7 | 0.2 | 0.2 | 0.02 |
| Peak area-standardized value (β) | 1.3 | 2.0 | 2.6 | 3.0 | 3.4 | 3.1 | 3.3 | 1.8 |
| Peak area-standardized value (γ) | 9.5 | 6.5 | 6.3 | 5.6 | 4.5 | 2.8 | 2.4 | 0.7 |

Figure 4:
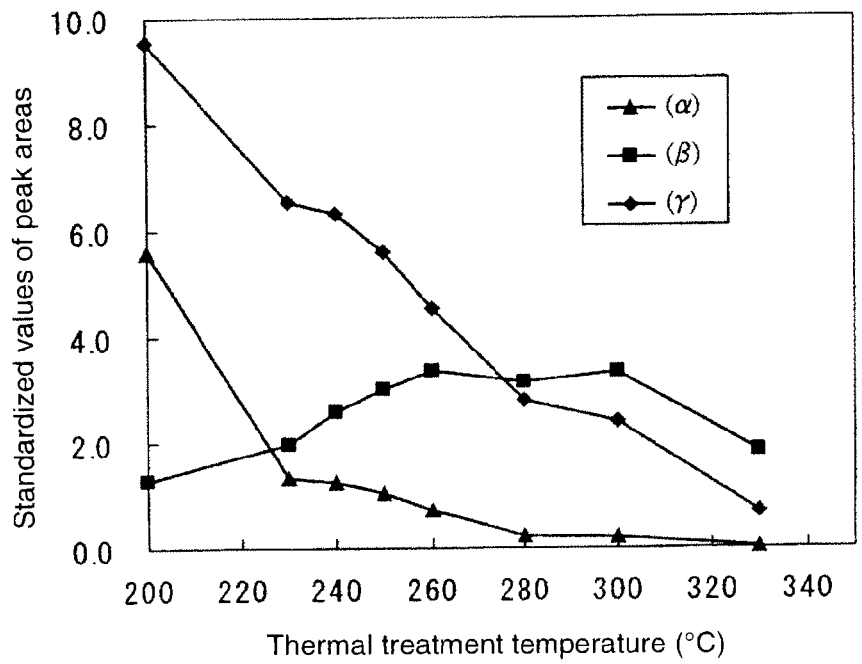
FIG. 4 is shows standardized values of peak areas of infrared absorption spectra obtained in Test Example 4.

As shown in Table 9 and FIG. 4, the peak area-standardized value of peak (α) derived from the amino group of γ-aminopropylmethyldiethoxysilane decreased as the temperature became high, and it became a value close to substantially zero at a temperature of at least 280° C.

It was thereby found that in order to promote the reaction of γ-aminopropylmethyldiethoxysilane with the terminal group COOH group of polyperfluorobutenyl vinyl ether A2, the temperature for the thermal treatment should better be high, but should be sufficient if it is at least 280° C.

On the other hand, the peak area-standardized value of peak (β) derived from the carbonyl group of the amide group formed by a reaction of γ-aminopropylmethyldiethoxysilane with the terminal group COOH group of polyperfluorobutenyl vinyl ether A2, increases as the temperature rises, i.e. as the peak area-standardized value of peak (α) decreases, within a range of from 250° C. to 260° C. However, at a temperature of at least 250° C. to 260° C., it becomes substantially constant, and when the temperature exceeds 300° C., it decreases.

It was thereby found that the bonding by the reaction of γ-aminopropylmethyldiethoxysilane with the terminal group COOH group of polyperfluorobutenyl vinyl ether A2 becomes sufficient at a temperature of at least 250° C. to 260° C. and that although it turns to decrease when the temperature exceeds 300° C., high level bonding is still maintained at 330° C.

Further, the peak area-standardized value of peak (γ) derived from the C—H bond of the ethoxy group of γ-aminopropylmethyldiethoxysilane, decreased as the temperature rose and became 0.7 at 330° C.

It was thereby found that the condensation reaction of γ-aminopropylmethyldiethoxysilane is promoted as the temperature is high.

From the foregoing results, it was confirmed that the temperature for the thermal treatment at which preferred results were obtained in Test Examples 1 to 3, corresponds to the temperature for the thermal treatment at which bonding of the polymer (A) and the silane coupling agent is promoted and maintained, and at which the condensation reaction of a silane coupling agent is promoted.

Test Example 5

[Small Angle X-Ray Scattering Analysis]

On a PTFE sheet, the polymer composition solution M1 was cast to form a film, which was dried under conditions of 100° C. for one hour and 280° C. for one hour to prepare a coating film A having a film thickness of about 100 μm. Further, film formation was carried out in the same manner, and the drying conditions were changed to 100° C. for one hour and 200° C. for one hour to prepare a coating film B. Further, using the polymer solution P1, film formation was carried out in the same manner as for the coating film B to prepare a coating film X. Then, a small-angle X-ray scattering measurement was carried out by using the above-mentioned coating films A, B and X by Nano-viewer manufactured by Rigaku Corporation. The measurement conditions were as shown below.

Figure 5:
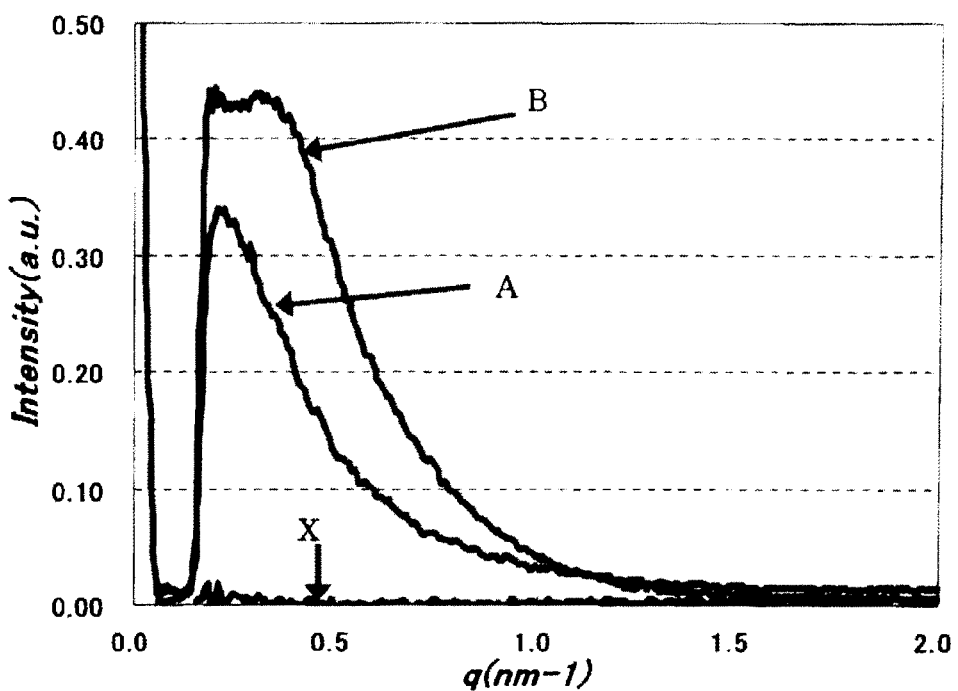
FIG. 5 is a scattering spectrum graph showing a result of measuring small-angle X-ray scattering of a coating film.

X-ray wavelength: 0.154 nm (CuKα ray)
Length of camera: 500 mm
Detector: IP (imaging plate)
Measurement mode: transmission measurement
Measurement temperature: room temperature
Exposure time: 30 minutes
Optical type slit; 1st 0.4 mm, 2nd 0.3 mm, 3rd 0.5 mm The result of a small-angle X-ray ray scattering measurement of a cast film was shown in FIG. 5. In FIG. 5, the vertical axis represents the intensity (optional unit) of X-ray scattering, and q of the horizontal axis represents a value of the following formula. In the following formula, λ is a wavelength, and θ is a scattering angle.

$$q = 4\pi/\lambda \times \sin(\theta/2)$$

In FIG. 5, A, B and X respectively represent scattering spectra of the coating films A, B and X.

From this result, in the case of the coating films A and B employing the polymer composition solution M1 having γ-aminopropylmethyldiethoxysilane mixed therein, a scattering peak which was not observed in the coating film X employing the polymer solution P1 having no such silane mixed therein, was detected. This indicates that in a uniform film in a state where no γ-aminopropylmethyldiethoxysilane is present, a non-uniform structure derived from γ-aminopropylmethyldiethoxysilane was formed. The size (D) of the non-uniform structure can be calculated from the value q (see FIG. 5) which can be read from the peak top of the scattering peak of this result (D=2π/q). Table 10 shows the temperature for the thermal treatment at the time of preparing the coating films A, B and X and the sizes (D) of the obtained non-uniform structures. From such results, it is estimated that a non-uniform portion of about 28 nm is present in the coating film A, and a non-uniform portion of about 20 nm is present in the coating film B.

From the results in FIG. 5 and Table 10, it is estimated that in the fluorinated polymer, γ-aminopropylmethyldiethoxysilane and its condensate form a nano cluster, and the size of this nano cluster tends to increase as the temperature for the thermal treatment becomes high. It is considered that this nano cluster works as an electric charge retaining portion of the electret and thus contributes to improvement of the above-described stability with time and thermal stability of retained electric charge, and it is considered that the improvement in the thermal stability of the electret in the present invention is brought about by an increase in the size of such a nano cluster.

TABLE 10

|  | Cast film | | |
| --- | --- | --- | --- |
|  | A | B | X |
| Polymer (composition) solution | M1 | M1 | P1 |
| Temperature for thermal treatment (° C.) | 280 | 200 | 200 |
| Value q | 0.22 | 0.31 | Nil |
| Size of non-uniform structure (nm) | 28 | 20 | — |

Test Example 6

Examples 41 to 44 and Comparative Examples 41 to 44

(1) Preparation of Electrets

An electret in each Example or Comparative Example was prepared in the same manner as in Example 8 except that the polymer composition solution was changed to the polymer composition solution in Tables 11 and 12, and the temperature for the thermal treatment and the grid voltage were adjusted to the values in Tables 11 and 12.

(2) Measurement of Surface Voltages

With respect to each electret thus prepared, as intended for an electrostatic induction conversion device for vehicles, the following respective surface voltages were measured, and the surface voltage residual ratio was obtained in the same manner as in Example 8. The results are shown in Tables 11 and 12.

TABLE 11

|  | Ex. 41 | Ex. 42 | Ex. 43 | Ex. 44 |
| --- | --- | --- | --- | --- |
| Polymer composition solution | M10 | M11 | M12 | M13 |
| Temperature for thermal treatment (° C.) | 260 | 280 | 280 | 280 |
| Grid voltage (V) | −1,200 | −1,200 | −1,200 | −1,200 |
| Initial surface voltage (V) | −1,102 | −1,087 | −1,082 | −1,067 |
| Storage time (hr) | 165 | 720 | 165 | 300 |
| Surface voltage before heating at 125° C. (V) | −1,095 | −1,010 | −1,060 | −983 |
| Surface voltage after heating at 125° C. (V) | −929 | −853 | −984 | −876 |
| Surface voltage residual ratio (%) | 85 | 85 | 91 | 89 |

TABLE 12

|  | Comp. Ex. 41 | Comp. Ex. 42 | Comp. Ex. 43 | Comp. Ex. 44 |
| --- | --- | --- | --- | --- |
| Polymer composition solution | M10 | M11 | M12 | M13 |
| Temperature for thermal treatment (° C.) | 200 | 200 | 200 | 200 |
| Grid voltage (V) | −1,200 | −1,200 | −1,200 | −1,200 |
| Initial surface voltage (V) | −1,090 | −1,065 | −1,104 | −1,070 |
| Storage time (hr) | 165 | 300 | 165 | 300 |
| Surface voltage before heating at 125° C. (V) | −1,080 | −1,050 | −1,070 | −1,000 |
| Surface voltage after heating at 125° C. (V) | −594 | −556 | −696 | −640 |
| Surface voltage residual ratio (%) | 55 | 53 | 65 | 64 |

When the surface voltage residual ratios shown in Tables 11 and 12 are compared with respect to cases wherein N-(β-aminoethyl)-γ-aminopropylmethyldimethoxysilane or m-aminophenyltrimethoxysilane is used as a silane coupling agent, it is evident that when Examples wherein the same polymer composition solution was used, are compared, the surface voltage residual ratio in each of Examples wherein the temperature for the thermal treatment was from 260 to 280° C., exceeded the surface voltage residual ratios in Comparative Examples wherein the temperature for the thermal treatment was 200° C.

Test Example 7

Examples 51 to 56 and Comparative Examples 51 to 55

(1) Preparation of Electrets

An electret in each Example or Comparative Example was prepared in the same manner as in Example 20 except that the polymer composition solution was changed to the polymer composition solution in Tables 13 and 14, and the temperature for the thermal treatment and the grid voltage were adjusted to the values in Tables 13 and 14.

(2) Measurement of Surface Voltages

With respect to each electret thus prepared, the respective surface voltages were measured in the same manner as in Example 20. The results are shown in Tables 13 and 14.

TABLE 13

|  | Ex. 51 | Ex. 52 | Ex. 53 | Comp. Ex. 51 | Comp. Ex. 52 |
|---|---|---|---|---|---|
| Polymer composition solution | M12 | M12 | M12 | M12 | M12 |
| Temperature for thermal treatment (° C.) | 300 | 280 | 260 | 230 | 200 |
| Grid voltage (V) | −1,200 | −1,200 | −1,200 | −1,200 | −1,200 |
| Initial surface voltage (V) | −1,191 | −1,091 | −1,080 | −1,105 | −1,075 |
| Storage time (hr) | 290 | 165 | 140 | 120 | 48 |
| Surface voltage before TSD heating (V) | −1,079 | −1,056 | −961 | −1,091 | −1,050 |
| Discharge peak temperature (° C.) | 258 | 249 | 228 | 205 | 188 |
| Discharge initiation temperature (° C.) | 174 | 177 | 174 | 170 | 149 |

TABLE 14

|  | Ex. 54 | Ex. 55 | Ex. 56 | Comp. Ex. 53 | Comp. Ex. 54 | Comp. Ex. 55 |
|---|---|---|---|---|---|---|
| Polymer composition solution | M10 | M12 | M13 | M10 | M11 | M13 |
| Temperature for thermal treatment (° C.) | 260 | 280 | 280 | 200 | 200 | 200 |
| Grid voltage (V) | −1,200 | −1,200 | −1,200 | −1,100 | −600 | −1,200 |
| Initial surface voltage (V) | −1,042 | −1,093 | −1,128 | −1,084 | −1,280 | −1,080 |
| Storage time (hr) | 360 | 165 | 140 | 340 | 190 | 280 |
| Surface voltage before TSD heating (V) | −1,000 | −992 | −1,095 | −1,054 | −1,202 | −1,036 |
| Discharge peak temperature (° C.) | 223 | 226 | 224 | 164 | 189 | 195 |
| Discharge initiation temperature (° C.) | 163 | 161 | 165 | 136 | 129 | 137 |

When the discharge initiation temperatures shown in Table 13 are compared with respect to cases wherein N-(β-aminoethyl)-γ-aminopropylmethyldimethoxysilane or m-aminophenyltrimethoxysilane was used as a silane coupling agent, it is evident that the discharge initiation temperature in each of Examples wherein the temperature for the thermal treatment was from 260 to 300° C., exceeded the discharge initiation temperatures in Comparative Examples wherein the discharge initiation temperature was less than 250° C.

Further, when the discharge initiation temperatures shown in Table 14 are compared between Examples wherein the same polymer composition solution was used, it is evident that the discharge initiation temperature in each of Examples wherein the temperature for the thermal treatment was from 260 to 280° C., exceeded the discharge initiation temperature in Comparative Examples wherein the temperature for the thermal treatment was 200° C.

Industrial Applicability

The present invention is useful for the production of an electret which is used for an electrostatic induction conversion device such as a power-generating unit, a microphone, etc.

The entire disclosure of Japanese Patent Application No. 2009-038508 filed on Feb. 20, 2009 including specification, claims, drawings and summary is incorporated herein by reference in its entirety.

Reference Symbols

10: copper substrate, 11: coating film, 12: DC high-voltage power source, 14: corona needle, 16: grid, 17: ammeter, 18: power source for grid, 19: hotplate, 20: counter electrode, 21: electret, 22: ammeter.

What is claimed is:

1. A process for producing an electret, which comprises a step of thermally treating a composition comprising a fluorinated polymer and a silane coupling agent, wherein the fluorinated polymer has an alicyclic structure in its main chain and has a carboxy group or an alkoxycarbonyl group as its terminal group; the silane coupling agent has an amino group; and the temperature for the thermal treatment is from 250° C. to 330° C.

2. The process for producing an electret according to claim 1, wherein the fluorinated polymer has, as the alicyclic structure, a fluorinated alicyclic structure in its main chain.

3. The process for producing an electret according to claim 1, wherein the fluorinated polymer has, as the alicyclic structure, a cyclic structure containing an etheric oxygen atom, in its main chain.

4. The process for producing an electret according to claim 1, wherein the fluorinated polymer has, as the alicyclic structure, a fluorinated alicyclic structure containing an etheric oxygen atom, in its main chain.

5. The process for producing an electret according to claim 1, wherein the weight average molecular weight of the fluorinated polymer is from 150,000 to 650,000.

6. The process for producing an electret according to claim 1, wherein the silane coupling agent is at least one member selected from the group consisting of γ-aminopropylmethyldiethoxysilane, γ-aminopropylmethyldimethoxysilane, N-(β-aminoethyl)-γ-aminopropylmethyldimethoxysilane, N-(β-aminoethyl)-γ-aminopropylmethyldiethoxysilane, γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane and aminophenyltrimethoxysilane.

7. The process for producing an electret according to claim 1, wherein the content of the silane coupling agent is from 0.1 to 20 mass %, based on the total amount of the fluorinated polymer and the silane coupling agent.

8. The process for producing an electret according to claim 1, which includes the following (1) to (4) in the order of (1), (2), (3) and (4):
  (1) a step of obtaining a coating fluid having the fluorinated polymer and the silane coupling agent dissolved in a solvent (a coating fluid-preparation step),
  (2) a step of coating a substrate with the coating fluid to form a coating layer comprising the fluorinated polymer and the silane coupling agent (a coating step),
  (3) a step of thermally treating the coating layer to obtain a coating film (a thermal treatment step), and
  (4) a step of injecting an electric charge to the coating film after the thermal treatment.

9. The process for producing an electret according to claim 8, wherein the solvent is a fluorinated organic solvent.

10. An electrostatic induction conversion device comprising the electret obtained by the process as defined in claim 1.

* * * * *